United States Patent
Floyd et al.

(10) Patent No.: US 10,795,578 B2
(45) Date of Patent: *Oct. 6, 2020

(54) DEDUPLICATING DATA BASED ON BOUNDARY IDENTIFICATION

(71) Applicant: Red Hat, Inc., Raleigh, NC (US)

(72) Inventors: Jered J. Floyd, Somerville, MA (US); Norman H. Margolus, Cambridge, MA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/129,843

(22) Filed: Sep. 13, 2018

(65) Prior Publication Data

US 2019/0012091 A1 Jan. 10, 2019

Related U.S. Application Data

(63) Continuation of application No. 15/004,217, filed on Jan. 22, 2016, now Pat. No. 10,078,451.

(51) Int. Cl.
*G06F 3/06* (2006.01)
*G06F 16/13* (2019.01)
*G06F 16/174* (2019.01)

(52) U.S. Cl.
CPC .......... *G06F 3/0608* (2013.01); *G06F 3/0631* (2013.01); *G06F 3/0641* (2013.01); *G06F 3/0659* (2013.01); *G06F 3/0673* (2013.01); *G06F 16/13* (2019.01); *G06F 16/1748* (2019.01); *G06F 3/061* (2013.01)

(58) Field of Classification Search
CPC ......... G06F 17/30091; G06F 17/30156; G06F 3/0608; G06F 3/0631; G06F 3/0644; G06F 3/0659; G06F 3/0673; G06F 3/06; G06F 17/30
USPC ....................................................... 711/156
See application file for complete search history.

(56) References Cited

U.S. PATENT DOCUMENTS

| | | | |
|---|---|---|---|
| 6,728,831 B1 * | 4/2004 | Bridge | G06F 3/0608 711/112 |
| 7,925,683 B2 | 4/2011 | Jain et al. | |
| 8,074,043 B1 | 12/2011 | Zeis | |

(Continued)

OTHER PUBLICATIONS

Y. Chang, T. Chen, Y. Chen, H. Wei, W. Shih and Z. Lai, "Optimizing space utilization of file systems on PCM-based storage devices," 2014 IEEE Non-Volatile Memory Systems and Applications Symposium (NVMSA), Chongqing, 2014, pp. 1-6, doi: 10.1109/NVMSA.2014.6927203.*

(Continued)

*Primary Examiner* — Pierre Miche Bataille
(74) *Attorney, Agent, or Firm* — Withrow & Terranova, PLLC

(57) ABSTRACT

Among other things, we describe a technique used in data deduplication that includes receiving a single data file designated to be written to a file storage system configured to store data in the form of blocks. The technique also includes identifying boundaries between portions of data within the single data file, and providing an indication to the file storage system to allocate blocks to the single data file based on the identified boundaries. Each block is allocated to, at most, One of the portions of data. The technique could also be used with objects instead of files.

20 Claims, 12 Drawing Sheets

(56) References Cited

U.S. PATENT DOCUMENTS

| | | | |
|---|---|---|---|
| 8,452,739 | B2 | 5/2013 | Jain et al. |
| 8,589,455 | B2 | 11/2013 | Jain et al. |
| 8,712,963 | B1 | 4/2014 | Douglis et al. |
| 9,646,043 | B1 | 5/2017 | Aronvich |
| 2001/0018731 | A1* | 8/2001 | Fujii .................... G06F 12/023 711/170 |
| 2012/0158671 | A1 | 6/2012 | Tzur et al. |
| 2013/0238570 | A1 | 9/2013 | Rao et al. |
| 2014/0012822 | A1 | 1/2014 | Aronovich et al. |
| 2014/0095439 | A1* | 4/2014 | Ram ................... G06F 11/1464 707/640 |
| 2014/0222769 | A1* | 8/2014 | Rao .................... G06F 17/2705 707/692 |
| 2015/0019501 | A1 | 1/2015 | Akirav et al. |
| 2015/0106345 | A1 | 4/2015 | Trimble et al. |
| 2015/0227414 | A1* | 8/2015 | Varma ................ G06F 11/0793 714/47.1 |
| 2016/0088593 | A1* | 3/2016 | Davydov ................ H04L 5/003 370/329 |
| 2016/0147797 | A1 | 5/2016 | Dolph et al. |
| 2016/0350325 | A1 | 12/2016 | Wang et al. |

OTHER PUBLICATIONS

X. Zhao, Y. Zhang, Y. Wu, K. Chen, J. Jiang and K. Li, "Liquid: A Scalable Deduplication File System for Virtual Machine Images," in IEEE Transactions on Parallel and Distributed Systems, vol. 25, No. 5, pp. 1257-1266, May 2014, doi: 10.1109/TPDS.2013.173.*

Non-Final Office Action for U.S. Appl. No. 15/004,217, dated Jun. 6, 2017, 13 pages.

Final Office Action for U.S. Appl. No. 15/004,217, dated Feb. 7, 2018, 15 pages.

Notice of Allowance for U.S. Appl. No. 15/004,217, dated May 15, 2018, 13 pages.

* cited by examiner

DEDUPLICATING DATA BASED ON BOUNDARY IDENTIFICATION

RELATED APPLICATION

This application is a continuation of co-pending U.S. patent application Ser. No. 15/004,217, filed on Jan. 22, 2016, entitled "DEDUPLICATING DATA BASED ON BOUNDARY IDENTIFICATION," which is hereby incorporated herein by reference in its entirety.

BACKGROUND

This description relates to storing data in a data storage system. Computers can be used to store, access, and modify data within a data storage system.

SUMMARY

The systems and methods that we describe here may encompass one or more of the following (and other) aspects, features, and implementations, and combinations of them.

In general, in an aspect, a method includes receiving a single data file designated to be written to a file storage system. The file storage system is configured to store data in the form of blocks. The method also includes identifying boundaries between portions of data within the single data file, and providing an indication to the file storage system to allocate blocks to the single data file based on the identified boundaries. Each block is allocated to, at most, one of the portions of data.

Implementations of this aspect can include one or more of the following features.

In some implementations, the file storage system can be associated with a deduplication engine. The deduplication engine can be capable of identifying that at least one of the blocks allocated based on the identified boundaries is a duplicate of another block stored by the file storage system, storing data indicating that the two blocks are duplicates of each other, and deleting or avoiding storing one of the two blocks in the file storage system.

In some implementations, each portion of the single data file can be capable of being represented as a separate file. The single data file can be at least one of a zip file, a tar file, or an archive file. The data file can include an aggregate of other data files.

In some implementations, the boundaries can be identified based on a rolling hash function.

In some implementations, the boundaries can be identified based on a Rabin fingerprinting function.

In some implementations, the boundaries can be identified recursively using one or more different techniques.

In general, in another aspect, a method includes receiving an indication at a file storage system to allocate blocks to a single data file based on boundaries identified between portions of data within the single data file. Each block is allocated to a single one of the portions of data. The method also includes, while the single data file is being written to storage media associated with the file storage system, when an identified boundary is reached, writing placeholder data to a remainder of a current block.

Implementations of this aspect can include one or more of the following features.

In some implementations, the indication can be received from a file system filter component that is independent of the file storage system and that passes through requests involving data storage or retrieval to the file storage system. The file system filter component can be implemented without modification of the file storage system.

In some implementations, each portion of the single data file can be capable of being represented as a separate file.

In some implementations, the file storage system can be associated with a deduplication engine. The deduplication engine can be capable of identifying that at least one of the blocks allocated based on the identified boundaries is a duplicate of another block stored by the file storage system, storing data indicating that the two blocks are duplicates of each other, and deleting or avoiding storing one of the two blocks in the file storage system.

In some implementations, the placeholder data can include zeros.

In some implementations, the method can further include indicating the location of the identified boundaries in a data structure maintained by the file storage system representing the single data file. The data structure can include an inode entry that indicates the length of data in a block corresponding to the inode entry. The data structure can include a metadata list of block lengths generated by a file system filter component. The metadata list can be stored in at least one of a separate data file, a database, or an extended attribute of the single data file.

In general, in another aspect, a method includes receiving an indication at the file storage system to allocate blocks to a single data file based on boundaries identified between portions of data within the single data file. Each block is allocated to a single one of the portions of data. The method also includes, while the single data file is being written to the file storage system, when an identified boundary is reached, truncating a current block.

In general, in another aspect, a system includes a storage system configured to store data in the form of blocks. The system also includes a receiver module configured to receive write requests and read requests. Each write request includes an indication to write a particular data item to the storage system. Each read request includes an indication to read a particular data item from the storage system. The system also includes a data alignment module configured to identify, in response to the receiver module receiving a write request, boundaries between portions of data within the data item of the write request, and provide an indication to the storage system to allocate blocks to the data item of the write request based on the identified boundaries. Each block is allocated to a single one of the portions of data. The data alignment module is also configured to retrieve, in response to the receiver module receiving a read request, blocks of the storage system allocated to the data item of the read request.

Implementations of this aspect can include one or more of the following features.

In some implementations, the data item can include a data file.

In some implementations, the data item can include an object.

One or more of the described implementations can provide various benefits. For example, the performance of a data storage system can be improved by using a data alignment module described herein. The data alignment module can, for instance, manage the transfer of data between a data-related process and a file system, such that data items are aligned in a manner that improves the efficiency of data deduplication by an underlying data deduplication system, even as one or more of the data items are modified. In some cases, when a data item is written and subsequently revised by the file system, fewer data writing operations are performed, and the file system potentially exhibits less fluctuation in data deduplication efficiency. These and other aspects, features, and implementations, and combinations of them, may be expressed as apparatus, methods, methods of doing business, means or steps for performing functions, components, systems, program products, and in other ways.

Other aspects, features, and advantages will be apparent from the description and the claims.

DESCRIPTION

Figure 1:
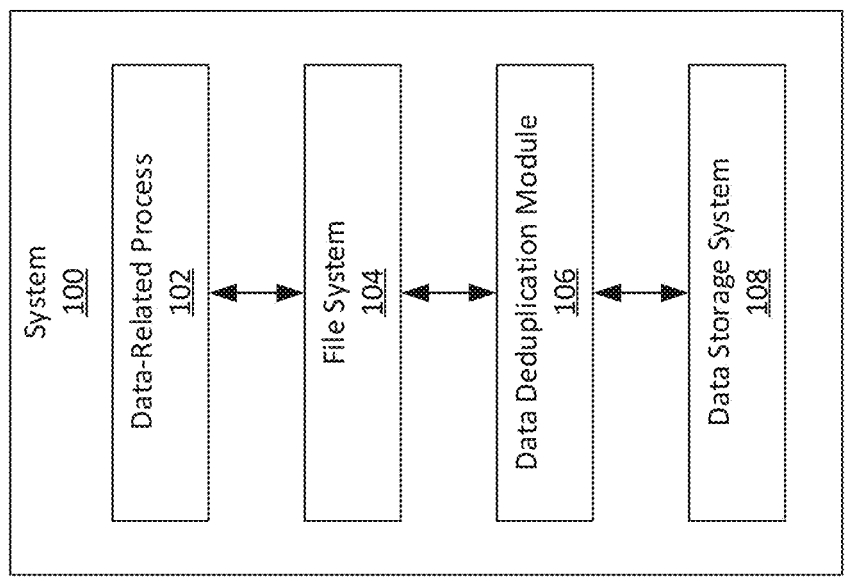
FIG. 1 is a block diagram of an example system that stores, retrieves, and modifies data.

A data deduplication system reduces the amount of redundant data that is stored in a data storage system. For example, some deduplication systems do this by identifying data that is stored in duplicate in more than one location on the data storage system, deleting the data from at least one of the duplicate data locations, and pointing the duplicate data location(s) to the remaining location storing the data. As another example, some deduplication systems do this by identifying data that, if written to a data storage system, would be stored in more than one location on that data storage system; in response, the deduplication systems avoid storing the duplicative data, such that a fewer copies of the data are retained by the data storage system. In some implementations, this can increase the amount of data that would be stored by the storage system by freeing up data locations that would otherwise be occupied by duplicate data. Further, some data deduplication systems provide data deduplication functionality by managing data-related requests intended for a data storage system, e.g., by intercepting the requests and modifying the requests or issuing new requests based on the intercepted requests.

In some implementations, a data deduplication system that manages data-related requests can be placed between a data-related process (e.g., a computerized process that creates, stores, accesses, and/or modifies data) and data storage systems (e.g., physical storage devices such as disk drives, flash memory devices, etc., and/or the systems or modules that manage logical units mapped to physical storage devices). The data deduplication system can then be used to handle data requests (e.g., requests to read or write data) between the data-related processes and the data storage systems. The data deduplication system can perform various functions in connection with storage of data on the data storage systems. For example, the data deduplication system can perform logical unit mapping, data compression, data deduplication, thin provisioning, and over-provisioning, and/or other techniques and operations connected with data storage.

In some cases, a data deduplication system can be incorporated into a file system (e.g., a system that manages the storage and retrieval of data on one or more data storage systems), or conceptually positioned between the file system and one or more data storage systems, such that it mediates requests between the file system and the data storage system. As an example, in some implementations, a data-related process can transmit a request to a file system to write data to a data storage system. In response, the file system can transmit the request to a data deduplication module. In turn, the data deduplication module can deduplicate the data into non-duplicative blocks and write the blocks to the data storage system (e.g., by writing to a particular logical unit or other portion of the data storage system). When we say "file system," we refer not only to the manner in which data is arranged in data storage, but also the utilities that enable operations to be performed on the data, e.g., reading and writing of data.

As another example, a data-related process can transmit a request to a file system to read data from a data storage system. In response, the file system can transmit the request to a data deduplication module. In turn, the data deduplication module can retrieve non-duplicative blocks from a data storage system that correspond with the requested data (e.g., by retrieving data from a particular logical unit or other portion of the data storage system), reconstruct the requested data from the retrieved blocks, and transfer the requested data to the file system.

In some implementations, the systems described could be portions of the same computing device (e.g., one or more software modules executed on a computing device, one or more physical components of the computing device, or combinations of both). In other implementations, the systems described could be portions of multiple separate devices. As a real-world example, a computing device might include a file system that manages one or more data storage systems of that computing device, and might also include a data deduplication module that handles data-related requests between the file system and the data storage systems. As another example, a first computing device might include a file system that manages one or more data storage systems, and a second computing device might include a data deduplication module that handles data-related requests between the file system and the one or more data storage systems. In this manner, each system need not be implemented on a single computing device, and can be implemented using one or more different devices.

In many cases, a data duplication system receives a data item that is to be stored on a data storage system, and partitions the data item into smaller portions (e.g., "blocks" of data). Before writing each of the portions of the data item to the data storage system, the data duplication system can first determine whether each portion of the data item already exists in the data storage system. If a particular portion of the data item does not already exist on the data storage system, the data duplication system can write that portion of the data item to the data storage system. However, if a particular portion of the data item already exists on the data storage system, the data duplication system can avoid writing that portion of the data item to the data storage system. Thus, the data duplication system can identify potentially duplicative data, and can reduce the likelihood that duplicative data is written to the data storage system.

In some cases, a data item can be partitioned into uniformly sized portions (e.g., portions having a fixed number of bytes). This can be useful, for example, if the data storage system includes one or more locations for storing a fixed amount of data, such that each portion of the data item can be evenly stored into a respective location of the data storage system.

In some situations, however, partitioning a data item into uniformly sized portions may reduce the efficiency of data deduplication. For example, when a data item is modified, contents of the data item may be offset from their original positions. As an example, a data item can be modified such that additional content is prepended to the beginning of the data item. As a result, the original content of the data item is offset by the length of additional content. Consequently, when the modified data item is partitioned into uniformly sized portions, the resulting portions may be substantially different than the original portions, even if much of the content of the data item may not have substantially changed. As a result, previously deduplicated data may no longer be deduplicated, despite the fact that the modified data item still contains similar content as the original data item.

As another example, a data item may be an aggregate of two or more other data items, as might be found in an archive file, backup file, or media file. The components that make up this aggregate item may also be stored as separate data items in the data storage system. If the aggregate data item is partitioned into uniformly sized portions, the start of a component in the aggregate item may not coincide with the start of one of the portions of the item. As a result, the component in the aggregate data item may not deduplicate against a separate data item with the same content as the component.

In some implementations, the performance of a data storage system can be improved by using a data alignment module. The data alignment module can, for example, manage the transfer of data between a data-related process and a file system, such that data items are aligned in a manner that improves the efficiency of data deduplication by an underlying data deduplication system, even as one or more of the data items are modified.

For instance, during a data storage operation, the data alignment module can receive, from a data-related process, a data item designated for storage by the data storage system. The data alignment module can locate particular boundaries within the data item, and modify the data item by partitioning it along one or more of those boundaries, creating one or more intermediate portions of variable size. The data alignment module can then transmit each of these intermediate variable-sized portions to the file system for storage. The file system, in turn, transmits the portions of data to the data deduplication module for deduplication and subsequent storage by the data storage system.

In some cases, the data alignment module need not actually partition the data into intermediate portions of data. For instance, during a data storage operation, the data alignment module can receive, from a data-related process, a data item designated for storage by the data storage system. The data alignment module can locate particular boundaries within the data item, insert padding data according to one or more of those boundaries, and then transmit the data item to the file system for storage. The file system, in turn, transmits the data item to the data deduplication module for deduplication and subsequent storage by the data storage system. In particular, the data alignment module can insert padding data such that, when the data item is subsequently partitioned into blocks during deduplication, each boundary coincidences with the beginning and/or end of a block.

In some implementations, when the data alignment module processes the data item in this manner, the resulting blocks produced by the data deduplication module are more likely to remain consistent, even when the data item is subsequently revised. Hence, the data deduplication system may be less susceptible to the effects of offset data (e.g., when existing contents of a data item are offset when the data item is revised). Thus, by first processing a data item using the data alignment module, when a data item is written and subsequently revised by the data storage system, the data storage system potentially performs fewer data writing operations, and potentially exhibits less fluctuation in data deduplication efficiency.

Figure 2A:
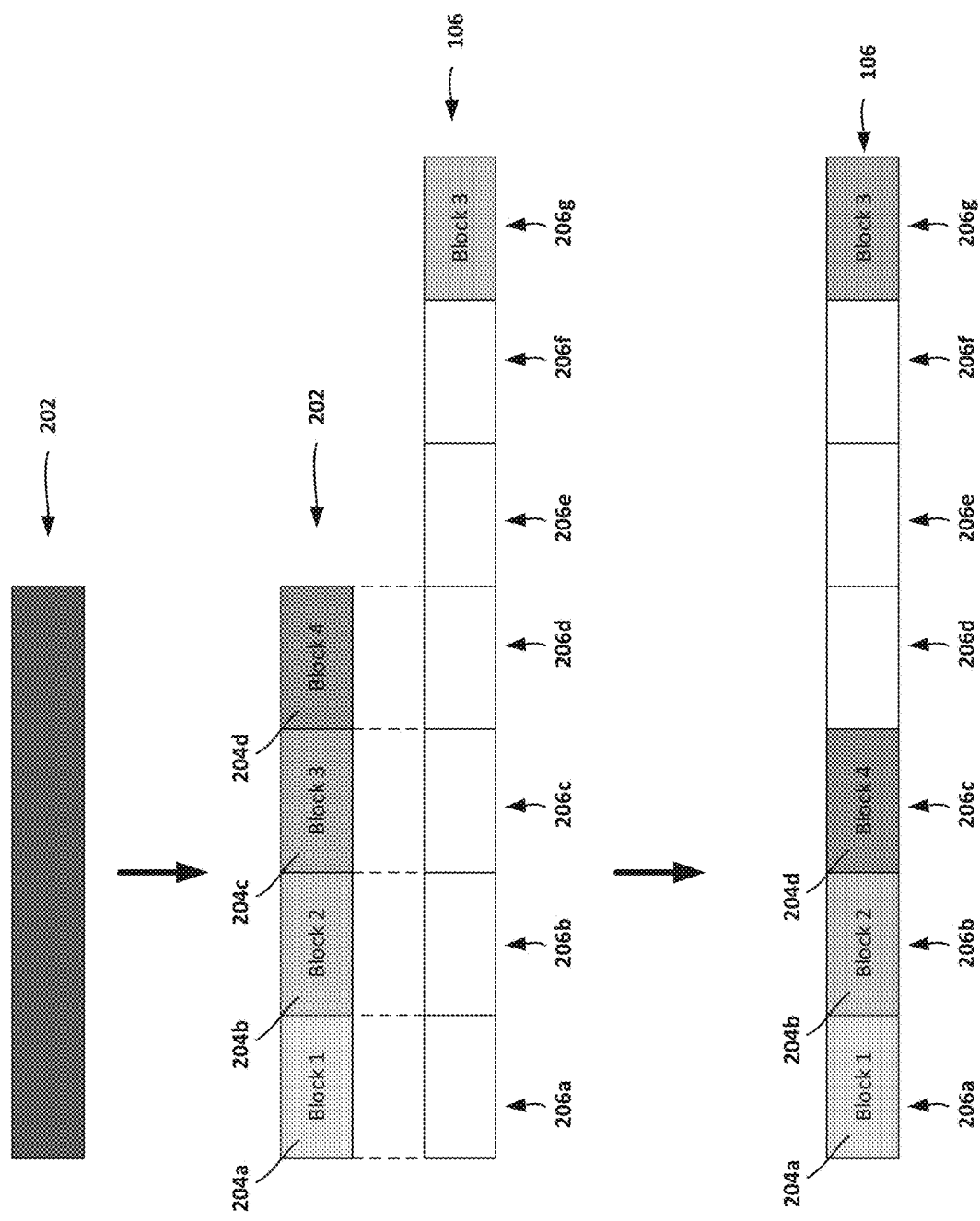
FIG. 2A is a block diagram of an example data writing operation that includes data deduplication using the system shown in FIG. 1.
Figure 2B:
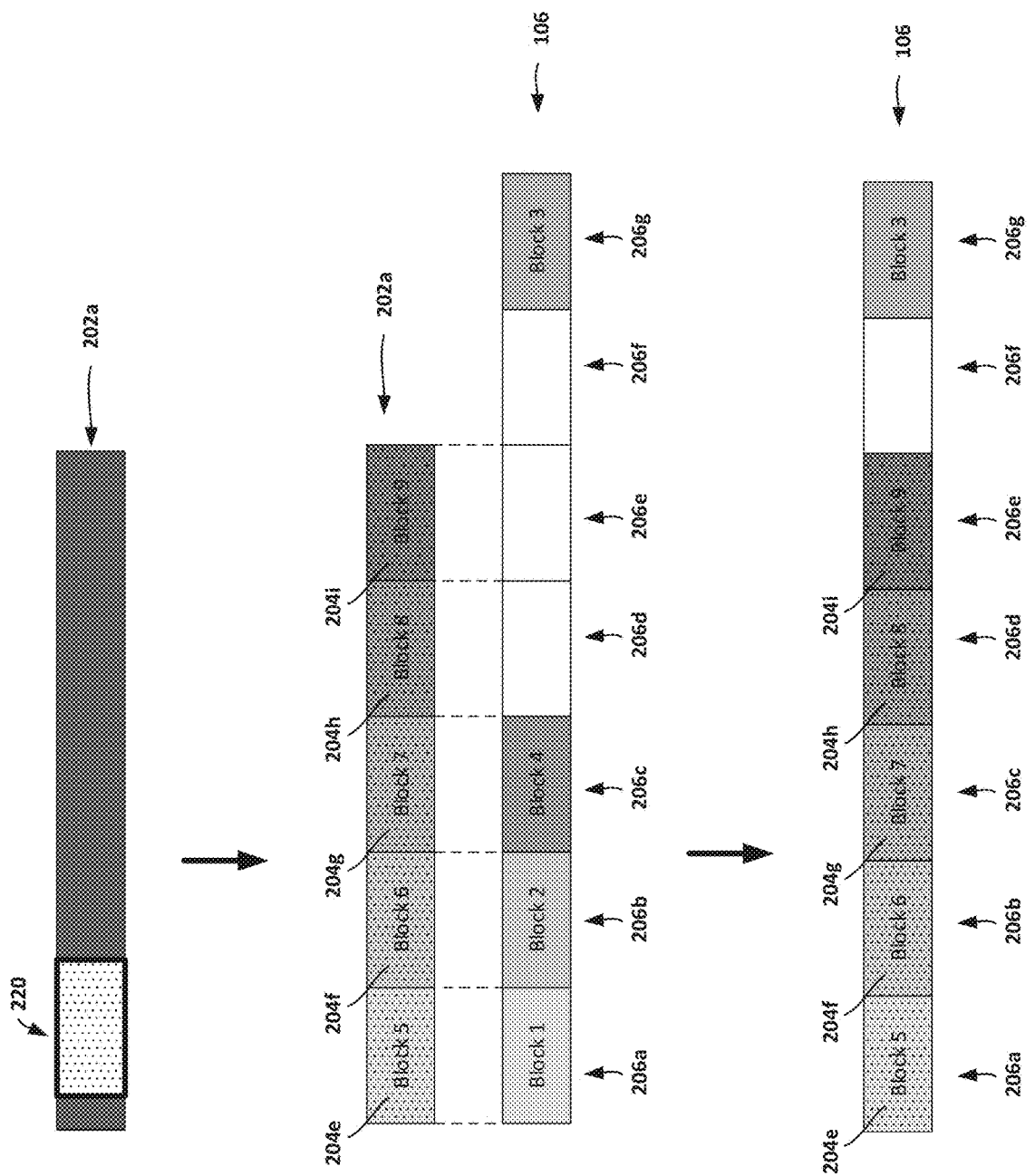
FIG. 2B is a block diagram of a data revision operation using the system shown in FIG. 1.
Figure 3:
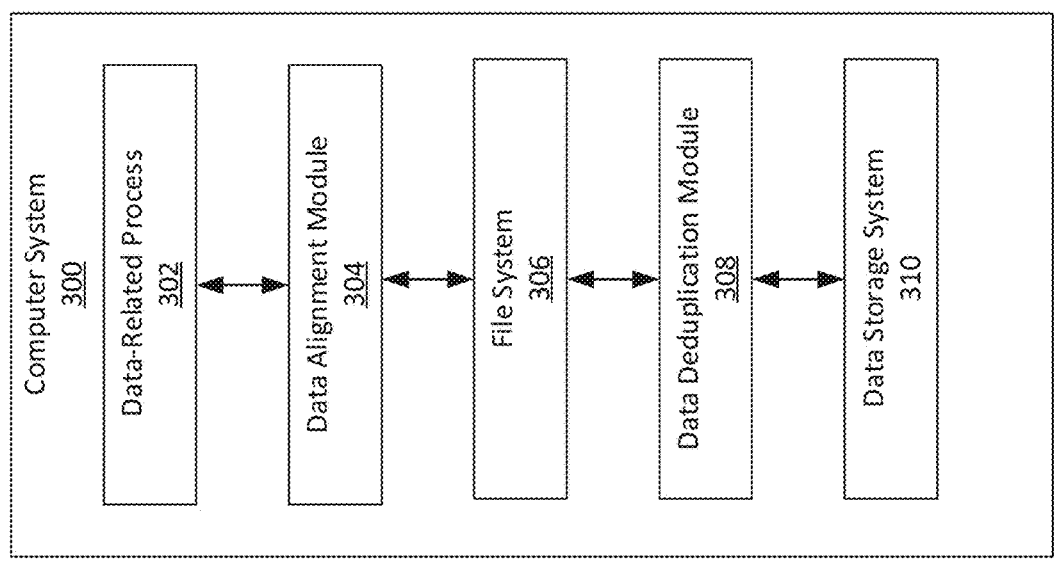
FIG. 3 is a block diagram of another system that stores, retrieves, and modifies data.
Figure 4A:
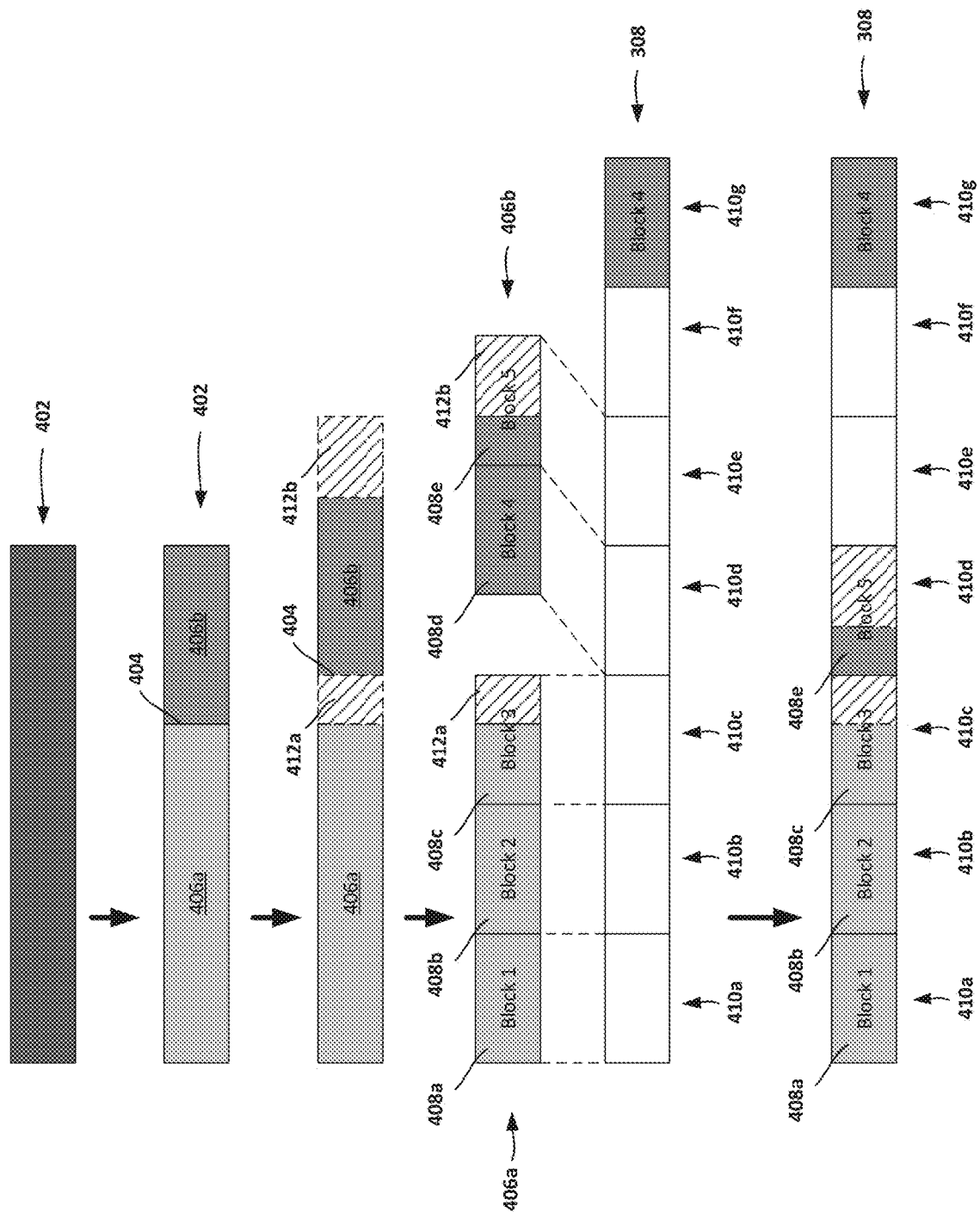
FIG. 4A is a block diagram of an example data writing operation that includes data deduplication using the system shown in FIG. 3.
Figure 4B:
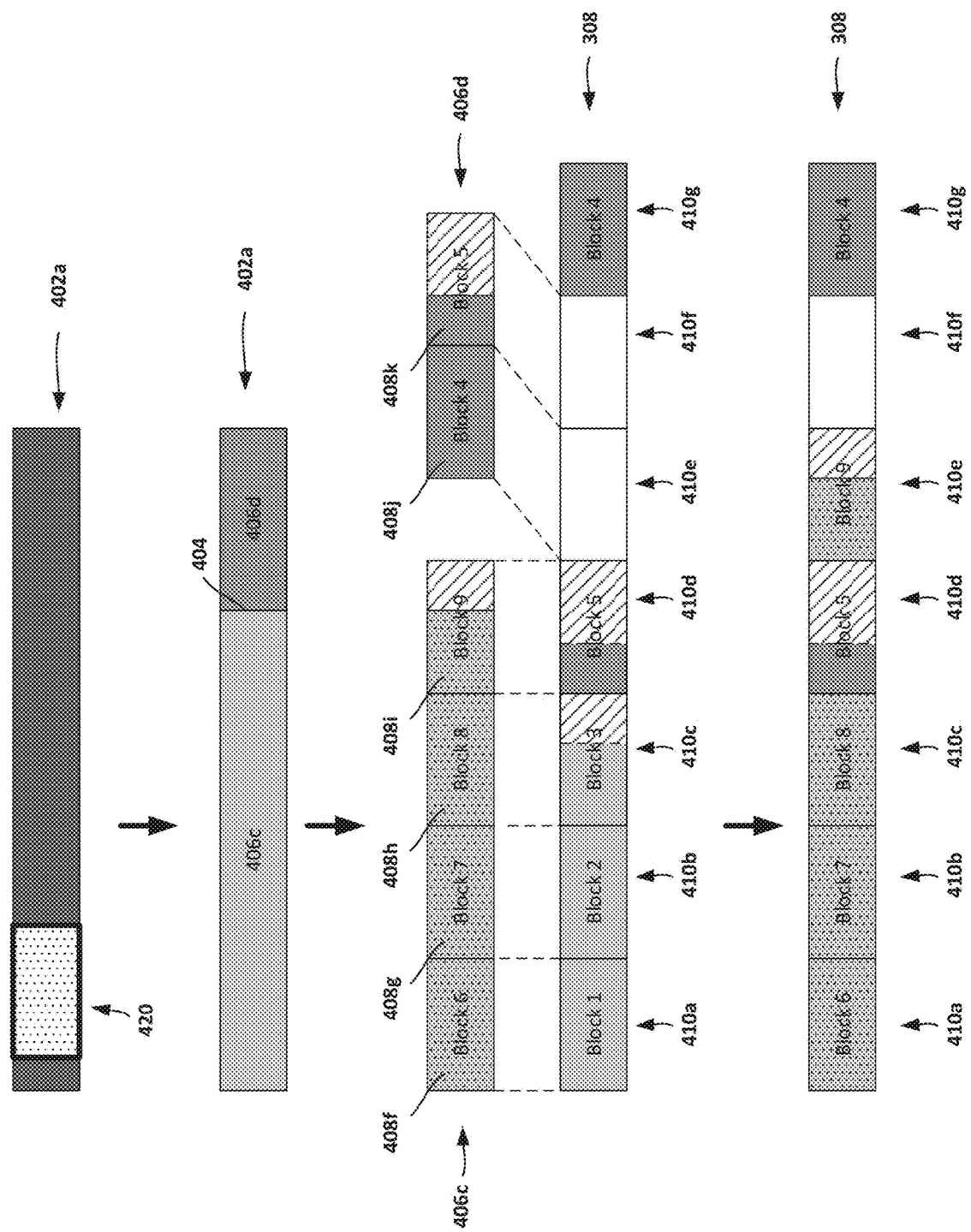
FIG. 4B is a block diagram of a data revision operation using the system shown in FIG. 3.

To illustrate this concept, FIG. 1 shows an example system without a data alignment module, and FIGS. 2A-B show example data storage operations of a system without a data alignment module. In contrast, FIG. 3 shows an example system having a data alignment module, and FIGS. 4A-B show example data storage operations of a system having a data alignment module.

FIG. 1 is a block diagram of a system 100 that stores, retrieves, and modifies data. The system 100 includes one or more data-related processes 102 (e.g., computer programs or portions of computer programs executing on the system), one or more file systems 104, one or more data deduplication modules 106, and one or more data storage systems 108. As noted above, the system 100 does not have a data alignment module. In an example implementation, a user interacts with the system 100 (e.g., through an appropriate user interface) in order to create, delete, and modify data. When a user wishes to store particular data (e.g., to retain certain data for later retrieval), a data-related process 102 transmits that data to a file system 104. In turn, the file system transmits the data to the data deduplication module 106, which identifies data that can be deduplicated. The data deduplication module 106 then transmits the deduplicated data to the data storage system 108 for storage (e.g., within one or more physical storage devices or logical units).

As another example, when a user wishes to retrieve particular data, a data-related process 102 requests that data from the file system 104. The file system 104 transmits the request in a way that it is received the data deduplication module 106, which retrieves deduplicated data from the data storage system 108, and reconstructs the requested data. The requested data is then transferred to the file system 104, which makes the data available to the data-related process 102.

As another example, when a user wishes to modify particular data, a data-related process 102 transmits the modified data to the file system 104. The file system 104 transmits the modified data to the data deduplication module 106 for deduplication. The data deduplication module 106 then transmits the deduplicated data to the data storage system 108 for storage.

Various components of the system 100 can be interconnected such that they can each transmit data to and receive data from other interconnected components. For example, some components of the system 100 can be connected such that the data-related processes 102 can communicate with the file system 104, such that the file system 104 can communicate with the deduplication module 106, and such that the data deduplication module 106 can communicate with the data storage system 108. The interconnection of components can be implemented in a variety of ways. In some implementations, some components can be directly connected to other components, for example through a serial bus connection, system bus, or other direct connection. In some implementations, some components of the system 100 can be interconnected through a local area network (LAN), through a wide area network (WAN), such as the Internet, or through a Storage Area Network (SAN), such as a Fibre Channel network, an iSCSI network, an ATA over an Ethernet network, or a HyperSCSI network. Other types of networks can also be used, for instance a telephone network (cellular and/or wired), a Wi-Fi network, Bluetooth network, near field communications (NFC) network, or other network capable of transmitting data between interconnected systems. In some implementations, two or more networks may be interconnected, such that components connected to one network can communicate with devices connected to another network. In some implementations, some components can be directly connected to other components, for example through a serial bus connection or other direct connection. In some implementations, one or more of the components (e.g., the data storage system 108) can be managed by a cloud storage interface. In an example, data storage system 108 can be distributed over one or more networks, and the cloud storage interface can manage data-related requests to and from the file system 104. In some implementations, the data deduplication module 106 can be a cloud gateway storage device that functions as a communications node between the file system 104 and the data storage system 108, and provides a cloud storage interface for the data storage system 108.

The system 100 is a device that processes data (e.g., creates, deletes, or modifies data). In some implementations, users can interact with the system 100 through an appropriate user interface in order to directly or indirectly process data. As examples, the system 100 can be a client computing device, such as a desktop computer, laptop, personal data assistant (PDA), smartphone, tablet computer, or any other computing device that allows a user to view or interact with data. In some implementations, the system 100 does not directly interact with users, and instead indirectly receives instructions and data from users through an intermediary system. As examples, the system 100 can be a computing device such as server computer that indirectly receives instructions and data from users via one or more client computing devices. In some implementations, the system 100 need not receive instructions and data from users at all. For example, in some cases, the system 100 can be automated, such that it creates, deletes, and modifies data without substantial input from a user.

The data-related processes 102 are computerized processes that create, store, access, and/or modify data. As an example, data-related processes 102 can be one or more instances of executable instructions (e.g., a computer program) that perform particular tasks that create, store, access, and/or modify data. Data-related processes 102 can be implemented on various types of components. For example, in some implementations, data-related processes 102 can be implemented on a processing apparatus (e.g., a computer processor) that executes a collection of instructions stored on a data storage device (e.g., memory, a physical storage device, and so forth). When executed, these instructions can perform data processing tasks. In some implementations, data-related processes 102 can be a sub-process of a broader application (e.g., a computer program) that performs additional functions other than creating, storing, accessing, and/ or modifying data. As an example, in some implementations, data-related processes 102 can be implemented as a part of an operating system kernel.

The file system 104 is a component that manages the storage and retrieval of information in a format that can be readily understood by one or more computer systems. The file system 104 typically includes both a specification of the manner in which data is to be arranged in data storage (e.g., on storage media), and also utilities that enable operations to be performed on the data, e.g., reading and writing of data. For example, the file system 104 can include one or more computerized processes or components that control how data is stored and retrieved from one or more data storage systems 108. For instance, a file system 104 can control how data is stored and retrieved from physical storage devices such as disk accessing storage devices (e.g., hard disk drives), non-volatile random access memory (RAM) devices, volatile RAM devices, flash memory devices, tape drives, memory cards, or any other devices capable of retaining information for future retrieval. As another example, the file system 104 can include one or more computerized processes or components that control how data is stored and retrieved from one or more logical units of the data storage system 108 (e.g., one or more logical units that have been mapped from one or more physical storage devices or other logical units). In the system 100 shown in FIG. 1, information from the data-related processes 102 is stored by the file system 104, and information requested from the data-related processes 102 is retrieved by the file system 104.

In order to increase the efficiency and/or reliability of data storage to the file system 104, data deduplication modules 106 can be used to process data requests and data transfers between the file system 104 and the data storage system 108. As described above, the data deduplication module 106 reduces the amount of redundant data that is stored in a data storage system 108 by identifying data that is (or would be) stored in duplicate in more than one location on the data storage system 108, deleting the data from at least one of the duplicate data locations (or avoiding storing the data again if the data is already stored at another location), and creating references from the duplicate data location(s) to the remaining location storing the data. In some implementations, the data deduplication modules might perform functions other than data deduplication, for example logical unit mapping, thin provisioning, and/or over-provisioning.

Logical unit mapping refers to the mapping of a logical unit to its corresponding physical data storage devices. A logical unit is a representation of data storage that may not directly correspond to physical data storage such as a physical disk. Instead, a logical unit may correspond to a portion of a physical data storage device such as a disk, and other logical units may share the same disk. Further, a logical unit may correspond to portions of multiple data storage devices, e.g., portions of multiple devices arranged in a RAID array. Logical unit mapping can be used to describe the relationship between a logical unit and its corresponding data storage, such that requests (e.g., requests from data-related processes 102) referencing particular logical units can be converted into requests referencing one or more corresponding portions of the underlying physical storage devices.

Thin provisioning is the act of not allocating physical resources (e.g., physical portions of a disk) to logical resources (e.g., a logical unit) until the physical resources are needed. For example, a physical storage device having 100 GB of storage capacity might be provisioned into ten logical units, each presenting a storage capacity of 10 GB. This physical storage can be "thin provisioned," such that even though each of the logical units are presented with 10 GB of storage capacity, storage portions of the physical storage device are not allocated to each of the logical units until these portions of the physical storage device are actually needed. These portions of the physical storage device can be, for example, "pages" of the physical storage device, where each page represents the minimum amount of data that can be allocated for the purposes of thin provisioning. Therefore, when no data is stored on any of the logical units, portions of the physical storage device are not substantially allocated to any pages of the logical units. As data is written to each of the logical units, portions of the physical storage device are incrementally allocated to the pages of the logical units to fulfill each data storage request. In some implementations, a page corresponds to an aggregation of sequential blocks.

Over-provisioning is the use of thin provisioning to give the appearance of having more physical resources than would be available if all of the logical resources were allocated to physical resources. For example, a physical storage device having 100 GB of storage capacity might be over-provisioned into twenty logical units, each presenting a storage capacity of 10 GB. Thus, the logical units cumulatively present 200 GB of available storage capacity, even though the underlying physical storage device only has a storage capacity of 100 GB. However, as the physical storage device is thin provisioned, when no data is stored on any of the logical units, none of the portions of the physical storage device are allocated to any pages of the logical units, regardless of the storage capacity presented by each of the logical units. As data is written to each of the logical units, portions of the physical storage device are incrementally allocated to the pages of the logical units to fulfill each data storage request. In this manner, an over-provisioned physical storage device can fulfill data storage requests corresponding to each of the logical units, so long as the cumulative data across all of the logical units does not exceed the physical storage limits of the physical storage device.

Multiple physical storage devices can be collectively thin provisioned or over-provisioned. As an example, a collection of ten physical storage devices, each having 100 GB of storage capacity might be over-provisioned into 100 logical units, each presenting a storage capacity of 100 GB. Thus, the logical units cumulatively present 10 TB of available storage capacity, even though the underlying physical storage devices only have a cumulative storage capacity of 1 TB. In the event that the cumulative data across all of the logical units approaches the physical storage limits of the physical storage devices, additional physical storage devices can be added to increase the cumulative storage capacity of the collection of physical storage devices.

While examples of logical mapping, thin-provisioning, and over-provisioning are described above, these examples are intended only to conceptually illustrate these features. In practice, logical mapping, thin-provisioning, and over-provisioning can be performed on any number of physical storage devices with respect to any number of logical units.

In some implementations, the system 100 might use a data-related process 102, a file system 104, a data deduplication module 106, and a data storage system 108 to store data. A conceptual example of this data-storage operation is shown in FIG. 2A. In this example, a data-related process 102 requests particular data (e.g., data item 202) be stored for future retrieval. As an example, a data-related process 102 can request that the data item 202 be stored by the file system 104 on the data storage system 108.

The data-related process 102 transmits the data item 202 to the file system 104. The file system 104 partitions the data item 202 into one or more blocks of data 204a-d. The number of blocks that the data item 202 is partitioned into can vary based on various factors, for example, based on the block size of the file system and the size of the data item 202. In turn, the file system 104 transmits the data blocks 204a-d to the data deduplication module 106, which performs data deduplication. Data deduplication may include further partitioning of the blocks 204a-d (e.g., if the data deduplication module block size is smaller than the file system block size). In this example, each block of data 204a-d represents unique information, and is correspondingly labeled "Block 1," "Block 2," "Block 3," and "Block 4," signifying that each block contains different information. However, in some implementations, two or more blocks of data might each contain identical data.

In some implementations, the file system module 104 can divide the data item 202 into blocks having a particular fixed size. This fixed size can vary, depending on the implementation. For example, in some cases, the fixed size can be less than or equal to fixed portions of the underlying data storage system 108, such that each block can be stored within a corresponding portion of the data storage system 108. These portions of the data storage system 108 can be, for example, locations of physical storage devices or logical units of the data storage system 108. For instance, as shown in FIG. 2A, an example data storage system 108 includes several locations 206a-f that can each store a particular fixed amount of data. The file system module 104 can divide the data item 202 into fixed sized blocks 204a-d (e.g., blocks having a size less than or equal to the capacity of each location 206a-g), such that each block can be stored in one of the locations 206a-g. The data deduplication module may further divide the blocks 204a-d to a smaller size for the purpose of identifying smaller duplicative blocks.

The data deduplication module 106 identifies, from among the blocks, duplicative blocks that are already stored on a logical unit of the data storage system 108, but stored at a location other than the location specified by the data-related process 102. If any duplicate blocks are found, the data deduplication module 106 records, for each of the duplicative blocks, the other location that already stores the block. For example, as shown in FIG. 2A, each of the blocks 204a-d is compared against the locations 206a-g of the data storage system 108. In some implementations, this comparison can be an exact byte-by-byte comparison between the blocks 204a-d and the blocks of the file system 104. However, in some implementations, this comparison need not be an exact byte-by-byte comparison, and can be instead be accelerated by a deduplication index. As an example, a deduplication index might include hash values of each block of the file system 104, such that the hashes of blocks 204a-d can be compared against the hashes of the blocks of the file system 104 in order to find duplicative data.

The locations 206a-g can be, for example, portions of one or more physical storage devices or logical units of the data storage system 108. The locations 206a-g need not be the locations specified by the data-related process 102.

As shown in FIG. 2A, the location 206g stores a block of unique data (indicated by a numerical block label "Block 3"), while the locations 206a-f are empty (indicated by the absence of labels). Here, the block 204c matches a block already stored in a location of the data storage system 108 (i.e., the location 206g storing a block with the same numerical block label, "Block 3"). Based on this match, the data deduplication module 106 records for the duplicative block 204c the other location that already stores the block (i.e., the location 206g) and does not write the block 204c to an additional location. The remaining blocks 204a, 204b, and 204d are written to locations of the data storage system 108 (e.g., the locations 206a-c), and their locations are likewise recorded. In this manner, only blocks that are not already stored within a location 206a-g are written. Thus, each block stored within the locations 206a-g can be unique.

The system 100 can also retrieve stored data (e.g., the data item 202) using the data-related process 102, the file system 104, and the data deduplication module 106. For example, a data-related process 102 might send a request to retrieve the data item 202 to the file system 104, which in turn transmits the request to the data deduplication module 106. In order to retrieve the data item 202, the data deduplication module 106 can retrieve the previously recorded locations of each of the blocks 204a-d. The file system module 104 then retrieves the blocks 204a-d stored at the recorded locations, and reassembles the blocks 204a-d in the correct sequence, recreating the original data item 202. This data item 202 is then transmitted to the data-related process 102, fulfilling the request. Thus, even though the blocks 204a-d might be stored in a different sequence within the locations 206a-g, and one or more blocks 204a-d may not have been duplicatively written to a location, the requested data item 202 can be reassembled into its original form in order to fulfill the request.

In the examples above, data is deduplicated in a manner that fully eliminates duplicative blocks. However, this need not be the case. In some implementations, data can be deduplicated in a manner that generally reduces the number of duplicative blocks, but not in a manner that necessitates fully eliminating all duplicative blocks. For example, the data deduplication module 106 may store information about deduplicated blocks in an index having a maximum size. In this example, the data deduplication module 106 would not deduplicate at least some duplicate blocks once the maximum size had been reached. Thus, in some implementations, even after data is deduplicated and written to locations of the data storage system 108, some duplicative blocks might still exist within the managed locations.

Data that has been previously deduplicated and stored (e.g., using the file system 104 and the data deduplication module 106) can be subsequently revised and re-stored for future retrieval. Data can be revised, for example, by changing portions of the data, adding additional portions of data, and/or removing existing portions of data. In some implementations, the system 100 might use a data-related process 102, a file system 104, and a data deduplication module 106 to revise already-stored data.

A conceptual example of a data revision operation is shown in FIG. 2B. In this example, a data-related process 102 requests that data previously stored by the file system 104 on the data storage system 108 (e.g., the data item 202) be revised, creating a revised data item 202a. As shown in FIG. 2B, in some implementations, the original data item 202 can be revised by inserting an additional portion of data 220 into the original data item 202, creating the revised data item 202a. In this example, the inserted portion of data 220 offsets portions of the original data of data item 202 (e.g., by pushing portions of the original data of data item 202 away from the beginning of the data item 202a). However, other than the inserted portion of data 220, the revised data item 202a is otherwise identical to the original data item 202.

After revising the data item 202 and creating the revised data item 202a, the data-related process 102 transmits the revised data item 202a to file system 104. In a similar manner as described above, the file system module 104 partitions the data item 202a into one or more blocks of data, and can, in some implementations, divide the data item 202a into blocks having a particular fixed size. In turn, the file system 104 transmits the data blocks to the data deduplication module 106, which performs data deduplication. For example, as shown in FIG. 2B, the file system module 104 can divide the revised data item 202a into the blocks 204e-i having the same fixed size as the blocks 204a-d of FIG. 2A, such that each block 204e-i also can be stored in a location 206a-g of the underlying data storage system 108. In this example, each block of data 204e-i represents unique information. However, due to the portion of data 220 that was inserted into the revised data item 202a, the data of the original data item 202 has been offset. As a result, each of the blocks 204e-i is different than the blocks 204a-d of FIG. 2A; this is signified in FIG. 2B by new block labels "Block 5," "Block 6," "Block 7," "Block 8," and "Block 9" that do not match the block labels of FIG. 2A (e.g., "Block 1," "Block 2," Block 3," and "Block 4"). Hence, even though the revised data item 202a contains portions of data that are identical to data contained in the original data item 202, the newly partitioned blocks 204e-i no longer match any of the blocks already stored in the data storage system 108. As a result, the new blocks 204e-i are not deduplicated, and are each written to the locations 206a-g of the data storage system 108 (e.g., to locations 206a-e). In this example, "Block 3" stored in the location 206g is still associated with another file (e.g., data other than the data items 202 and 202a), and is retained, while "Block 1," "Block 2," and "Block 4" are deleted or overwritten. Thus, due to a data revision, previously deduplicated data is no longer deduplicated, despite the fact that the revised file still contains significant portions of data that are identical to that of the original data.

In some situations, these data offsets can detrimentally affect the performance of the system 100. For example, as data is stored and subsequently revised by the system 100, data may become offset after each revision. Thus, substantial portions of data may have to be rewritten after each revision, even if only a small portion of data was added, removed, or otherwise revised. Accordingly, even if only small portions of data are revised, an offset of data could cause the file system 104, the data deduplication module 106, and the data storage system 108 to re-write significant portions of data. Likewise, an offset of data could cause the data deduplication module 106 to divide otherwise unchanged data into new and distinct blocks of data, and could detrimentally affect the existing data deduplication (e.g., by causing previously deduplicated data to no longer be deduplicated). As a result, the data deduplication efficiency of a file (e.g., the number of blocks that can be identified as duplicative and are not written by the data storage system) can significantly change with every data revision. In some cases, this can lead to deteriorated system performance (e.g., due to an increased number of data writing operations) and unpredictable utilization of the underlying storage devices (e.g., due to fluctuating data deduplication efficiency).

As described above, in some implementations, the performance of a data storage system can be improved by using a data alignment module. The data alignment module can, for example, manage the transfer of data between a data-related process and a file system, such that when data is written and subsequently revised by the system, the system potentially performs fewer data writing operations, and potentially exhibits less fluctuation in data deduplication efficiency. In some cases, the data alignment module can be implemented as a file system filter component (e.g., virtual file system, or filter driver) that is independent of the data storage system, such that the performance of the data storage system can be improved without modifying the data storage system itself. To illustrate, FIG. 3 is a block diagram of a system 300 that includes a data alignment module 304. Apart from the addition of the data alignment module 304, the system 300 can be similar to the system 100. For example, like the system 100, the system 300 stores, retrieves, and modifies data. Further, the system 300 and the system 100 can have similar components. For example, the system 300 can have one or more data-related processes 302 similar to the data-related processes 102, one or more file systems 306 similar to the file system 104, and one or more data deduplication modules 308 similar to the data deduplication module 106.

In an example implementation, a user interacts with the system 300 (e.g., through an appropriate user interface) order to create, delete, and modify data. When a user wishes to store particular data (e.g., to retain certain data for later retrieval), a data-related process 302 transmits that data to the data alignment module 304. The data alignment module 304 modifies the data, creating intermediate data. The intermediate data is then transmitted to the file system 306, which transmits the intermediate data to the data deduplication module 308 for deduplication. The data deduplication module 308 identifies data from the intermediate data that can be deduplicated. The data deduplication module 308 then transmits the deduplicated data to the data storage system 310 for storage (e.g., within one or more physical storage devices or logical units).

In another example, when a user wishes to retrieve particular data (e.g., previously stored data), a data-related process 302 requests that data from the data alignment module 304. In turn, the data alignment module 304 requests intermediate data from the file system 306. In turn, the file system 306 transmits the request to the data deduplication module 308, which retrieves deduplicated data from the data storage system 310, and reconstructs the intermediate data. The intermediate data is then transferred to the file system 306. In turn, the file system 306 transmits the intermediate data to the data alignment module 304, which reconstructs the requested data. The data alignment module 304 then transmits the requested data to the data-related process 302, which makes the data available to the user.

In another example, when a user wishes to modify particular data (e.g., previously stored data), a data-related process 302 transmits the modified data to the data alignment module 304. In turn, the data alignment module 304 creates intermediate data, and transmits the intermediate data to the file system 306. In turn, the file system 306 transmits the intermediate data to the data deduplication module 308 for deduplication. The data deduplication module 308 then uses the data storage system 310 to save deduplicated data for future retrieval.

As described above, in some implementations, the performance of system 300 is improved by the addition of the data alignment module 304. For instance during a data storage operation, the data alignment module 304 can receive, from a data-related process 302, a data item (e.g., a file) designated for storage by the file system 306 on a data storage system 310. The data alignment module 304 can locate particular boundaries within the data item, and modify the data item by partitioning it along one or more of those boundaries, creating one or more intermediate portions of variable size. The data alignment module 304 can then transmit each of these intermediate variable-sized portions to the file system 306. In turn, the file system 306 can transmit the variable-sized portions to the data deduplication module 308 for deduplication and subsequent storage by the data storage system 310. In some implementations, when the data alignment module 304 processes the data item in this manner, the resulting blocks produced by the data deduplication module 308 are more likely to remain consistent, even when the data item is subsequently revised. Hence, compared to the system 100, implementations of the system 300 may be less susceptible to the effects of offset data (e.g., when existing data is offset when the data item is revised). Thus, by first processing a data item using the data alignment module 304, when a data item is written and subsequently revised by the system, the system 300 potentially performs fewer data writing operations, and potentially exhibits less fluctuation in data deduplication efficiency.

An example data storage operation of the system 300 is shown in FIG. 4A. In this example, a data-related process 302 requests particular data (e.g., data item 402) be stored for future retrieval. For instance, a data-related process 302 can request that data item 402 be stored by the file system 306 on the data storage system 310.

The data-related process 302 transmits the data item 402 to the data alignment module 304. The data alignment module 304 locates one or more boundaries 404 within the data item 402, and modifies the data item 402 by partitioning it along the boundaries 404, creating one or more intermediate portions 406a-b of variable size. Although one boundary 404 is shown separating two portions 406a-b, in practice, there can be multiple boundaries 404 (e.g., two, three, four, and so forth) that separate the data item 402 into three or more portions (e.g., three, four, five, and so forth). In some implementations, there might not be a boundary 404 at all, and the data alignment module 304 might not separate the data item 402 into different portions.

The boundaries 404 of a data item 402 can vary, depending on the implementation. For example, in some implementations, the data item 402 might be an archive file (e.g., a ZIP, TAR, RAR file), where the data item 402 acts as a container for multiple different sub-files. The boundaries 404 can represent the separation between data corresponding to each of the sub-files contained within the archive file.

In another example, the data item 402 might be a file that contains combinations of two or more different assets, such as a document file (e.g., a DOC, PPT, or PDF file) that contains a combination of text, image, audio, and/or video information. For instance, the data item 402 might be a document file that contains combinations of one or more passages of text, one or more different images, one or more different audio samples, and/or one or more different videos embedded in the text. The boundaries 404 can represent the separation between the different types of data contained within the data item 402. For example, boundaries 404 can represent the separation between data representing text and data representing an image, the separation between data representing one image and data representing another image, the separation between data representing an audio sample and data representing a video sample, and so forth.

The boundaries 404 need not represent the separation between different sub-files, different assets, or different types of data contained within a data item 402. For instance, in some implementations, the boundaries 404 can separate data according to any particular patterns that is observed within the data item 402. As an example, a boundary might represent the location of one or more particular sequences of data, and can, for example, mark the beginning, the end, or an intermediate portion of those particular sequences of data.

The data alignment module 304 can use one or more different techniques to identify the boundaries 404 within the data item 402. As an example, the data alignment module 304 can parse the data item 402 (e.g., by reading the contents of the data item 402 sequentially), in order to identify boundaries 404 based on sequences of data that it encounters. For example, in the case of an archive file, the data alignment module 304 might reference a list of known file types and their corresponding header information (e.g., known sequences of data that represent the beginning of different types of files). As the data alignment module 304 parses the data item 402, when the data alignment module 304 encounters a sequence of data associated with a particular file type, the data alignment module 304 might identify a boundary 404 at the beginning of that sequence of data.

As another example, in the case of a document file, the data alignment module 304 might reference a list of known asset types or data types (e.g., text, different types of images, different types of audio, different types of video, and so forth) and their corresponding header information. As the data alignment module 304 parses the data item 402, when the data alignment module 304 encounters a sequence of data associated with a particular type of data or asset, the data alignment module 304 might identify a boundary 404 at the beginning of that sequence of data.

In some implementations, the data alignment module 304 parses data by simply reading the data sequentially and looking for particular sequences of data. In others implementations, the data alignment module 304 might parse data by using a hash function. A hash function can be, for example, a function that maps data of arbitrary size to data of fixed size, where differences in input data produce differences in output data (i.e., "hash values"). In some implementations, the hash function can be a rolling hash function. For example, the data alignment module 304 can parse the data item 402 using a moving window (e.g., representing a particular length of data), where the contents of the window are input into a hash function. If the outputted hash value fulfills particular criteria (e.g., if it matches one or more predetermined hash values corresponding to particular file types, data types, asset types, a specific value or values, or other criteria), the data alignment module identities a boundary 404 within the window of data (e.g., at the beginning of the window, at the end of the window, or at an intermediate position within the window). As the window is moved sequentially throughout the data item (e.g., by "sliding" or "rolling" the window from the beginning of the data item 402 to the end of the data item 402), corresponding hash values are calculated using the hash function, and boundaries are identified when the hash values meet the particular criteria. Examples of rolling hash functions include functions based on Rabin fingerprinting or on the Rabin-Karp algorithm.

The data alignment module 304 need not necessarily identify the boundaries 404 based on a pre-determined list of data sequences or hash values. For instance, in some implementations, the data alignment module 304 might identity the boundaries 404 based on a statistical analysis of the data item 402. As an example the data alignment module 304 might parse the data item 402 (e.g., by sequentially reading the contents of the file or by using a rolling hash function) and identity the boundaries 404 based on the occurrence of particular statistical phenomena. For instance, the data alignment module 304 might identify particular sequences of data that occur relatively more frequently than other sequences of data, identify particular sequences data that are statistically more likely to represent separations within the data, and so forth). In this manner, the data alignment module 304 is not limited only to identifying boundaries 404 based on pre-determined sequences of data.

In some implementations, the data alignment module 304 can identify boundaries using two or more different techniques. For example, the data alignment module 304 can identify boundaries 404 using one technique when it encounters one type of file, and identify boundaries 404 using another technique when it encounters a different type of file. As an example, upon encountering an archive file, the data alignment module might identify boundaries by locating the separation between the sub-files contained within the archive file. Upon encountering a document file, the data alignment module 304 might identify boundaries by locating the separation between the different types of data or assets contained within the document file. And upon encountering other types of files, the data alignment module 304 might identify boundaries through a statistical analysis of the file. In this manner, the data alignment module 304 can use any number of different boundary identification techniques, depending on the circumstance.

In some implementations, the data alignment module 304 can identify boundaries using one or more different techniques recursively. For example, upon encountering an archive file, the data alignment module 304 might identify boundaries 404 by locating the separation between the sub-files contained within the archive file. The data alignment might identify additional boundaries within the sub-files by using additional techniques as described above for each sub-file.

After identifying the boundaries 404 within the data item 402, the data alignment module partitions the data item 402 along the boundaries 404, creating the intermediate portions 406a-b. The data alignment module 402 also records, for the data item 402, the identity and the sequence of the intermediate portions 406a-b, such that the data item 402 can be reconstructed in the future.

In some circumstances, the intermediate portions 406a-b might not be evenly divisible into blocks having a particular fixed sized. For example, as shown in FIG. 4A, the intermediate portion 406a has a length corresponding to between two and three locations of the data storage system 310. To improve deduplication efficiency, the data alignment module 304 transmits the intermediate portions 406a-b to the file system 306 in such a way to ensure that each file system block contains data corresponding to only a single intermediate portion 406a-b.

In one implementation, the data alignment module 304 can append "padding data" 412a (e.g., arbitrary additional data information) to the intermediate portion 406a, such that when the intermediate portion 406a is divided into blocks, the block 408c is the same size as the other blocks 408a-b. Padding data can be, for example, a sequence of bits having a value of zero, a sequence of bits having values of one, or any other particular sequence of bits. The data alignment module 304 also records, for the block 408c, the location where the padding data begins, such that the padding data is not interpreted as being a part of the intermediate portion 406a or the data item 402 in subsequent data writing or data reading operations.

As another example, as shown in FIG. 4A, the intermediate portion 406b has a length corresponding to between one and two locations of the data storage system 310.

Accordingly, the block 408e is not the same size as the locations of the data storage system 310 or the other block 408d. As above, to account for this difference, the data alignment module 304 can append padding data 412b to the intermediate portion 406b such that when the intermediate portion 406b is divided into blocks the block 408e is the same size as the other block 408d. In some implementations, the data alignment module can refrain from padding the intermediate portion 406b as it is the final portion of the data item and the file system 306 can have the capability to store files that are shorter than an exact multiple of the block size by recording the file length in metadata.

After inserting padding data as necessary, the data alignment module 304 then transmits the intermediate portions 406a-b and padding 412a-b to the file system 306. In a similar manner as the file system module 104, in some implementations, the file system module 306 can divide the data item 402 into one or more blocks of data 408a-e. For example, the intermediate portion 406a is partitioned into blocks of data 408a-c, and the intermediate portion 406b is partitioned into blocks of data 408d-e. In turn, the file system 306 transmits the intermediate blocks 408a-e to data deduplication module 308, which performs data deduplication. Data deduplication may include further partitioning of the blocks 408a-e if the data deduplication module block size is smaller than the file system block size.

In a similar manner as described with respect to FIGS. 2A-B, the number of blocks that the intermediate portions 406a-b are partitioned into can vary based on various factors, for example, based on the size of each block and the size of the intermediate portions 406a-b. In this example, each block of data 408a-e represents unique information, and is correspondingly labeled "Block 1," "Block 2," "Block 3," "Block 4," and "Block 5," signifying that each block contains different information. However, in some implementations, two or more blocks of data might each contain identical data.

In some implementations, instead of padding, the data alignment module 304 can transmit intermediate portions 406a-b to file system 306 such that each intermediate portion is stored in a separate file. In this case, the start of each file, corresponding to a single intermediate portion, will always start at the beginning of a block. The data alignment module 304 also records the location and order of each intermediate portion 406a-b such that the data item can be correctly interpreted in subsequent data writing or data reading operations. As with the padding implementation, the intermediate portion 406a is partitioned into blocks of data 408a-c, and the intermediate portion 406b is partitioned into blocks of data 408d-e. In turn, the file system 306 transmits the intermediate blocks 408a-e to data deduplication module 308, which performs data deduplication. Data deduplication may include further partitioning of the blocks 408a-e if the data deduplication module block size is smaller than the file system block size. As above, the number of blocks that the intermediate portions 406a-b are partitioned into can vary based on various factors, for example, based on the size of each block and the size of the intermediate portions 406a-b.

The data deduplication module 308 identifies, from among the blocks, duplicative blocks that are already stored on a physical storage device or logical unit of the data storage system 310, but stored at a location other than the location specified by the data-related process 302. In a similar manner as described with respect to FIGS. 2A-B, if any duplicate blocks are found, the data deduplication module 308 records, for each of the duplicative blocks, the other location that already stores the block. For example, as shown in FIG. 4A, each of the blocks 408a-e is compared against the locations 410a-g of the data storage system 310. As above, in some implementations, this comparison can be an exact byte-by-byte comparison between the blocks 408a-e and the blocks of data storage system 310. However, in some implementations, this comparison need not be an exact byte-by-byte comparison, and can be instead be accelerated by a deduplication index. As an example, a deduplication index might include hash values of each block of the data storage system 310, such that the hashes of blocks 408a-e can be compared against the hashes of the blocks of the data storage system 310 in order to find duplicative data.

The locations 410a-g can be, for example, portions of one or more physical storage devices or logical units of the data storage system 310. As shown in FIG. 4A, the location 410g initially stores a block of unique data (indicated by a numerical block label "Block 4"), while the locations 410a-f are initially empty (indicated by the absence of labels). Here, the block 408d matches a block already stored in a locations of the data storage system 310 (i.e., the location 410g storing a block with the same numerical block label, "Block 4"). Based on this match, the data deduplication module 308 records, for the duplicative block 408d, the other location that already stores the block (i.e., the location 410g), and deletes the block 408d. The remaining blocks 408a, 408b, 408c, and 408e are written to locations of the data storage system 310 (e.g., the locations 410a-e), and their locations are likewise recorded. In this manner, only blocks that are not already stored within a location 410a-g are written. Thus, each block stored within the locations 410a-g can be unique.

As with system 100, while the example system 300 above deduplicates data in a manner that fully eliminates duplicative blocks, this need not be the case. In some implementations, data can be deduplicated in a manner that generally reduces the number of duplicative blocks, but not in a manner that necessitates fully eliminating all duplicative blocks. For example, the data deduplication module 308 may store information about deduplicated blocks in an index having a maximum size. In this example, the data deduplication module 308 would not deduplicate at least some duplicate blocks once the maximum size had been reached. Thus, in some implementations, even after data is deduplicated and written to locations of the data storage system 310, some duplicative blocks might still exist within the managed locations.

The system 300 can also retrieve stored data (e.g., the data item 402) using the data-related process 302, the data alignment module 304, the file system 306, the data deduplication module 308, and the data storage system 310. For example, a data-related process 302 might send a request to retrieve the data item 402 to the data alignment module 304. In turn, the data alignment module 304 retrieves the previously recorded identity of the intermediate portions 406a-b, and sends a request to retrieve the intermediate portions 406a-b to the file system 306. In order to retrieve the intermediate portions 406a-b, the file system module 308 retrieves the previously recorded locations of each of the blocks 408a-e. In turn, the file system 306 transmits the request to the data deduplication module 308. The data deduplication module 308 then retrieves the blocks 408a-e stored at the recorded locations, and the file system 306 reassembles the blocks 408a-e in the correct sequence, recreating the intermediate portions 406a-b. The intermediate portions 406a-b are then transmitted to the data alignment module 304, which reconstructs the original data item 402 (e.g., using the previously recorded sequence of the intermediate portions 406a-b), and removes padding data if used. This data item 402 is then transmitted to the data-related process 302, fulfilling the request. Thus, even though the blocks 408a-e might be stored in a different sequence within the locations 410a-g, and one or more blocks 408a-e may not have been duplicatively written to a location, the requested data item 402 can be reassembled into its original form in order to fulfill the request.

Data that has been previously deduplicated and stored (e.g., using the file system 306, the data deduplication module 308, and the data storage system 310) can be subsequently revised and re-stored for future retrieval. Data can be revised, for example, by changing portions of the data, adding additional portions of data, and/or removing existing portions of data. In some implementations, the system 300 might use a data-related process 302, a data alignment module 304, a file system 306, a data deduplication module 308, and a data storage system 310 to revise already-stored data. As described above, in some implementations, the performance of system 300 is improved by the addition of the data alignment module 304. For example, by first processing data using the data alignment module 304, when data is written and subsequently revised by the system, the system 300 potentially performs fewer data writing operations, and potentially exhibits less fluctuation in data deduplication efficiency.

A conceptual example of a data revision operation using the system 300 is shown in FIG. 4B. In this example, a data-related process 302 requests that data previously stored by the file system 306 on the data storage system 310 (e.g., the data item 402) be revised, creating a revised data item 402a. As shown in FIG. 4B, in some implementations, the original data item 402 can be revised by inserting an additional portion of data 420 into the original data item 402, creating the revised data item 402a. In this example, the inserted portion of data 420 offsets portions of the original data of data item 402 (e.g., by pushing portions of the original data of the data item 402 back from the beginning of the data item 402a). However, other than the inserted portion of data 420, the revised data item 402a is otherwise identical to the original data item 402.

After revising the data item 402 and creating the revised data item 402a, the data-related process 302 transmits the revised data item 402a to the data alignment module 304. In a similar manner as described above, the data alignment module 304 locates one or more boundaries 404 within the data item 402, and modifies the data item 402 by partitioning it along the boundaries 404, creating one or more intermediate portions 406c-d of variable size. Due to the portion of data 420 that was inserted into the revised data item 402a, the data of the original data item 402 has been offset in the revised data item 402a. Correspondingly, the boundary 404 is also offset in the revised data item 402a (e.g., pushed away from the beginning of the revised data item 402a). Accordingly, the intermediate portion 406c is larger in size than the intermediate portion 406a of FIG. 4A (due to the insertion of the portion of data 420), while the intermediate portion 406d remains the same size and contains the same data as the intermediate portion 406b of FIG. 4B (as no data has been inserted or otherwise revised).

As before, the data alignment module 402 also records, for the data item 402a, the identity and the sequence of the intermediate portions 406c-d, such that the data item 402a can be reconstructed in the future. The data alignment module 304 then transmits the intermediate portions 406c-d to file system 306. The data alignment module 304 may use the padding implementation described above, the multiple file implementation described above, or any other implementation that achieves the desired result.

In a similar manner as described above, the file system 306 partitions the intermediate portions 406c-d (and padding, if used) into one or more blocks of data. For example, as shown in FIG. 4B, the file system 306 can divide the intermediate portions 406c-d into the blocks 408f-k having the same fixed size as the blocks 408a-e of FIG. 4A, such that each block 408f-k also can be stored in a location 410a-g of the underlying data storage system 310.

In this example, each block of data 408f-i represents unique information. Due to the portion of data 420 that was inserted into the revised data item 402a, the data of the original data item 402 has been offset, and intermediate portion 406c is not the same as the intermediate portion 406a of FIG. 4A. As a result, each of the blocks 408f-i, corresponding to the intermediate portion 406c, is different than the blocks 408a-c of FIG. 4A; this is signified in FIG. 4B by new block labels "Block 6," "Block 7," Block 8," and "Block 9," that do not match the block labels of FIG. 4A (e.g., "Block 1," "Block 2," Block 3," "Block 4," and "Block 5"). However, as the intermediate portion 406d remains the same as the intermediate portion 406b of FIG. 4A, each of the blocks 408j-k (corresponding of the intermediate portion 406d) is the same as the blocks 408d-e; this is signified in FIG. 4B by the same block labels "Block 4" and "Block 5." Hence, even though the revised data item 402a was revised in a manner that offset a substantial portion of existing data, this offset in data did not change the blocks 408j-k corresponding to the intermediate portion 406d beyond the boundary 404. As a result, while the newly partitioned blocks 408f-i no longer match any of the blocks already stored in the data storage system 310 and are each written to the locations 410a-g of the data storage system 310 (e.g., to locations 410a, 410b, 410c, and 410e), the newly partitioned blocks 408j-k match blocks that are already stored in the data storage system 310 (e.g., in the locations 410d and 410g) are not re-written.

In this manner, the data alignment module 304 can be used partition tiles into two or more different intermediate portions, such that revisions corresponding to one intermediate portion are isolated to that intermediate portion, and do not affect the partitioned blocks of other intermediate portions. As a result, intermediate portions that represent offset, but otherwise identical data, do not have to be re-written to the data storage system 310 after each file revision. In a similar manner, as revisions to data are isolated to particular intermediate portions, the partitioned hocks of other intermediate portions remain unchanged, and existing data deduplication of the unchanged intermediate portions remains the same. Thus, in some cases, a revision to an existing file that offsets the contents of a substantial portion of that file would be isolated to a limited number of intermediate portions, and might not necessarily result in the loss of existing data deduplication for the entirety of the file. Accordingly, the use of the data alignment module 304 makes data deduplication efficiency relatively more stable and predictable, as small changes to a file are less likely to result in large changes in data deduplication efficiency for that file.

Again, as described above, some cases, the data alignment module need not actually partition a data item into intermediate portions of data stored as separate data items. For instance, in some implementations, the data alignment module can receive a data item 402a, and locate one or more boundaries 404 within the data item 402a in a similar manner as described above. However, instead of partitioning the data item 402a into intermediate portions 406c-d, the data alignment module can insert "padding data" (e.g., arbitrary additional data information) to the data item 402a, such that when the data item 402a is divided into blocks (e.g., by a file system), the boundary 404 will coincidence with the beginning and/or end of a block. In a similar manner as described above, the resulting blocks produced by the data deduplication module are more likely to remain consistent, even when the data item is subsequently revised. For example, a revision to an existing file that offsets the contents of a substantial portion of that file would be isolated to a limited number of blocks, and might not necessarily result in the loss of existing data deduplication for the entirety of the file. Hence, the data deduplication system may be less susceptible to the effects of offset data (e.g., when existing contents of a data item are offset when the data item is revised).

For simplicity, in the examples above, the data-related process 302, the data alignment module 304, the file system 306, the data deduplication module 308, and the data storage system 310 are described as performing particular processes sequentially. However, in practice, some or all of the processes performed by the data-related process 302, the data alignment module 304, the file system 306, the data deduplication module 308, and the data storage system 310 can be performed in parallel. For example, in some cases, when a data-related process 302 requests that a data item be written to the data storage system 310, the data alignment module 304 can immediately begin streaming the data item to the file system 306, and subsequently the deduplication module 308, without first partitioning the data item into intermediate portions. As the data item is streamed to the deduplication module 308 and written to the data storage system 310 the data alignment module 304 can monitor the data item in order to identify boundaries. When a boundary is identified, the data alignment module 304 can suspend the data writing operation, and truncate (and/or pad) the current block that is being written to the data storage system 310. The data alignment module 304 can then resume the data writing operation by directing the remaining data to a different block of the data storage system 310. In this manner, the data-related process 302, the data alignment module 304, the file system 306, the data deduplication module 308, and the data storage system 310 can, at times, operate simultaneously during a data writing or data reading operation.

Figure 5:
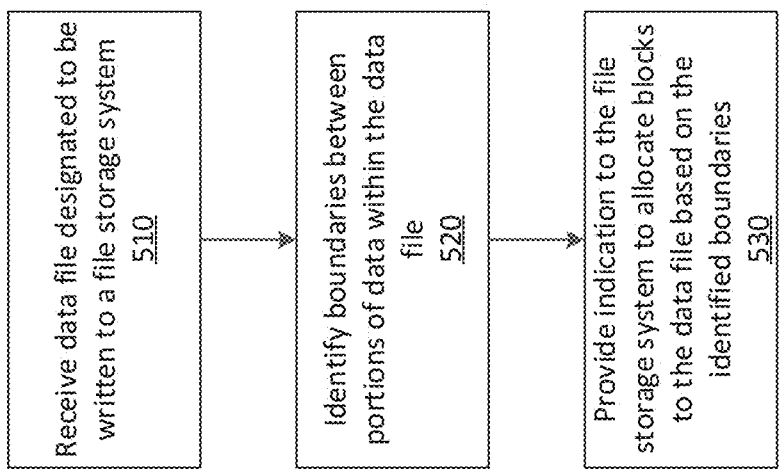
FIG. 5 is a block diagram of an example process for processing data to be stored on file system.

An example process 500 for processing data to be stored on a file system is shown in FIG. 5.

The process 500 begins by receiving a single data file designated to be written to a file storage system (step 510). A data file can be, for example, an item of data, such as a data item 202, 202a, 402, or 402a, as described above. In some cases, the single data file can be a container file or compressed data file, such as a zip file, a tar file, or an archive file. In some cases, the single data file can be an aggregate of other data files. For example, a single data file can contain one or more other data sub-files, and each of the sub-files are capable of being represented as a separate or distinct file.

As described above, the file storage system can be configured to store data in the form of blocks. For example, in some cases, a file system can have one or more storage locations, and can store portions of data (e.g., blocks) in each of the storage locations. As described above, in some cases, the single data file can be received by a data alignment module, such as a data alignment module 304.

The process 500 continues by identifying boundaries between portions of data within the single data file (step 520). Boundaries can be identified using one or more of the techniques described above. For instance, in some cases, one or more boundaries can be identified by identifying separation between different types of data with the single data file. As an example, the single data file may be a container for multiple different sub-files, and boundaries can be identified that separate each of the sub-files from each other. As another example, the single data file may be a file that contains combinations of multiple different assets, and boundaries can be identified that separate each of the assets from each other. As yet another example, the single data file may contain patterns of data, and boundaries can be identified by identifying particular patterns that occur in the single data file. As described above, in some cases, boundaries can be identified by a data alignment module, such as a data alignment module 304.

One or more different techniques to can be used to identify boundaries. As an example, the data file can the parsed in order to identify boundaries based on sequences of data that are encountered. As another example, boundaries can be identified by referencing a list of known asset types or data types (e.g., text, different types of images, different types of audio, different types of video, and so forth) and their corresponding header information. Boundaries can be identified when a sequence of data associated with a particular type of data or asset is encountered. As yet another example, boundaries can be identified using a hash function (e.g., a rolling hash function), fingerprinting functions (e.g., a Rabin fingerprinting function), and/or through statistical analysis of the contents of the data file. In some implementations, boundaries can be identified using a combination of one or more different techniques.

Once the boundaries are identified, an indication is provided to the file storage system to allocate blocks to the single data file based on the identified boundaries (step 530). In some cases, each block can be allocated to, at most, one of the portions of data. This can be performed using one or more techniques described above. For example, a data file can be partitioned according to each of the identified boundaries, creating one or more intermediate portions of variable size. These intermediate portions can be then partitioned into portions of data having a particular size (e.g., blocks), such that they each can be stored in a respective storage location of the file system.

As another example, one or more boundaries can be identified within the data file, and padding data can be inserted into the data file according to the identified boundaries. The padding data can be inserted such that when the data file is subsequently partitioned into portions of data having a particular size (e.g., blocks each boundary coincides with the beginning and/or end of a block.

As described above, in some cases, a data alignment module, such as a data alignment module 304, can transmit the intermediate portions of data to a file system or data deduplication module, such that the intermediate portions of data are partitioned into blocks and stored in respective storage locations of the file system. As described above, data stored on a file system can be deduplicated, such that the amount of redundant data that is stored in the file system is reduced. This can be performed using one or more techniques described above. For example, in some cases, at least one of the blocks allocated based on the identified boundaries can be identified as being a duplicate of another block stored by the file storage system. An indication that the two blocks are duplicates of each other can be stored, and one of the two blocks can be deleted. As described above, in some cases, data can be deduplicated by a data deduplication module, such a data deduplication module 308.

As described above, one or more of the techniques described above can be implemented using a file system filter component that is independent of the data storage system, such that the performance of the data storage system can be improved without modifying the data storage system itself.

Figure 6:
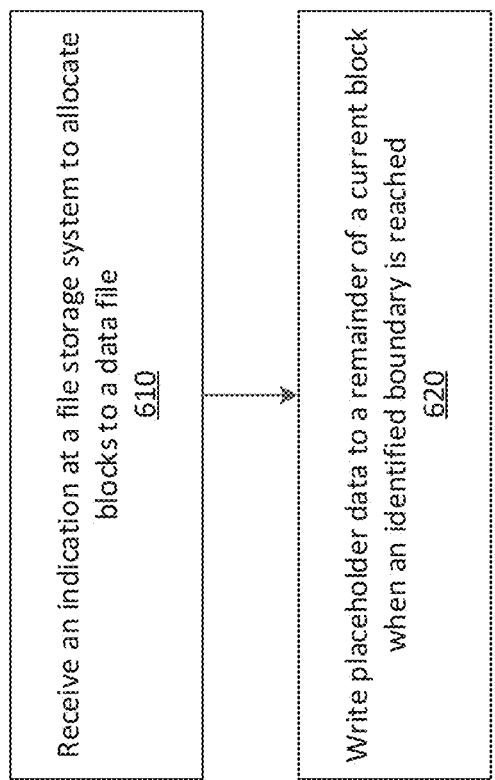
FIG. 6 is a block diagram of another example process for processing data to be stored on a file system.

As described above, in some cases, when data items are partitioned into intermediate portions based on identified boundaries, the intermediate portions might not be evenly divisible into blocks having a particular fixed sized. Thus, each of the resulting blocks may not be the same size as a corresponding storage location of a file system. To account for this difference, "padding data" (e.g., arbitrary additional data information) can be appended to the non-uniformly sized blocks, such that the padded block is the same size as the other blocks. An example process 600 for processing data in this manner is shown in FIG. 6.

The process 600 begins by receiving an indication at a file storage system to allocate blocks to a single data file based on boundaries identified between portions of data within the single data file (step 610). Each block can be allocated to a single one of the portions of data. As an example, as described above, the contents of a data file can be parsed (e.g., by a data alignment module or file system filter component) in order to identify boundaries corresponding to separate portions of data within the data file. The file system can then store the data file based on these boundaries.

While the single data file is being written to storage media associated with the file storage system, when an identified boundary is reached, placeholder data is written to a remainder of a current block (step 620). For example, when the data file is partitioned into intermediate portions based on identified boundaries, the intermediate portions might not be evenly divisible into blocks having a particular fixed sized. "Padding data" (e.g., arbitrary additional data information) can be appended to the non-uniformly sized blocks, such that the padded block is the same size as the other blocks. As described above, padding data can be, for example, a sequence of bits having a value of zero, a sequence of bits having values of one, or any other particular sequence of bits.

As another example, one or more boundaries can be identified within the data file, and padding data can be inserted into the data file according to the identified boundaries. The padding data can be inserted such that when the data file is subsequently partitioned into portions of data having a particular size (e.g., blocks), each boundary coincides with the beginning and/or end of a block.

In some cases, for each block, the location where the padding data begins must be recorded such that the padding data is not interpreted as being a part of the block, the intermediate portion of data, or the data file. This can be stored, for example, in a data structure maintained by the file storage system (e.g., stored on the file storage system) representing the single data file. In some cases, the data structure can include an inode entry for each block that indicates the length of data in the block. As another example, the data structure can be a metadata list of block lengths stored by a data alignment module. The metadata list can be stored in a separate data file, a database, or an extended attribute of the single data file. In some cases, the data structures can be generated by the file system filter component, then maintained by the file storage system (e.g., stored on the file storage system) for retrieval.

As described above, data stored on a file system can be deduplicated, such that the amount of redundant data that is stored in the file system is reduced. This can be performed using one or more techniques described above. For example, in some cases, at least one of the blocks allocated based on the identified boundaries can be identified as being a duplicate of another block stored by the file storage system. An indication that the two blocks are duplicates of each other can be stored, and one of the two blocks can be deleted. As described above, in some cases, data can be deduplicated by a data deduplication module, such a data deduplication module 308.

As also described above, one or more of the techniques described above can be implemented using a data alignment module that is independent of the data storage system, such that the performance of the data storage system can be improved without modifying the data storage system itself. As an example, indications to store a data file on a file system can be received from a file system filter component that is independent of the file storage system, and the file system filter component can pass through requests involving data storage or retrieval to the file storage system.

Although one or more blocks can be padded, this need not be the case. For example, in some cases, while a data file is being written to the file storage system, when an identified boundary is reached, the current block can be truncated. In this manner, no additional data is written to a particular storage location of the file system beyond the boundary. Data writing operation can be resumed by directing the remaining data to be written to a different storage location of the file system. This can be beneficial, for example, as it can allow boundary identification and data deduplication operations (e.g., as described above) to be performed simultaneously or substantially simultaneously during a data writing or data reading operation by the file system.

Figure 7:
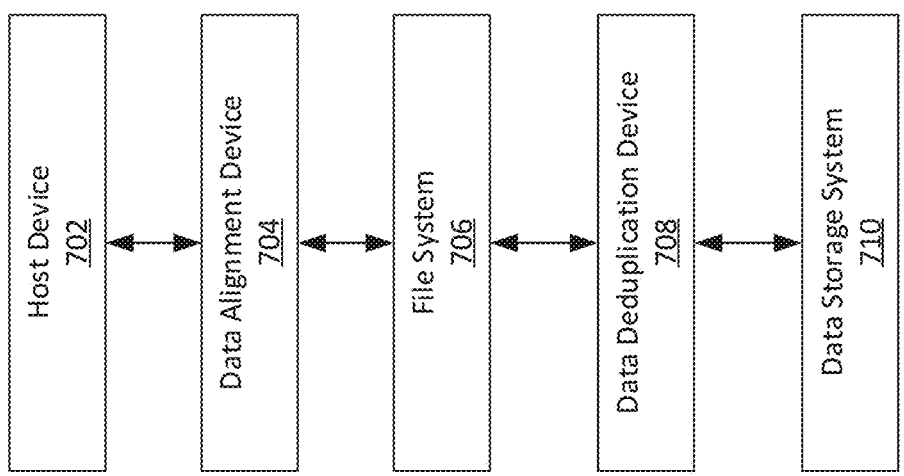
FIG. 7 is a block diagram of another example system that stores, retrieves, and modifies data using multiple devices.

While the above examples illustrate how data-related processes, data alignment modules, data deduplication modules, and file systems can be implemented on a single device, in practice, these components can be implemented across multiple different devices. As an example, as shown in FIG. 7, a system 700 can have similar functionality as implementations of system 300. System 700 includes a host device 702, a data alignment device 704, a file system 706, a data deduplication device 708, and a data storage system 710. In this example, the host device 702, the data alignment device 704, the file system 706, the data deduplication device 708, and the data storage system 710 can have similar functionality as the data-related process 302, the data alignment module 304, the file system 306, the data deduplication module 308, and data storage system 310 of FIG. 3, respectively. However, each of the host device 702, the data alignment device 704, the file system 706, the data deduplication device 708, and the data storage system 710 can be implemented on a different physical device. For example, each of these devices can be implemented on a separate computer system, where each system is interconnected through one or more direct connection (e.g., a serial bus connection or system bus) or one or more networks (e.g., LANs, WANs, SANs, Fibre Channel networks, iSCSI networks, Ethernet networks, HyperSCSI networks, Win networks, Bluetooth networks, NTC networks, telephone networks, and other wired or wireless networks). In some implementations, some components can be implemented on the same device, while one or more other components can be implemented on other devices. As an example, in some implementations, the host device 702 and the data alignment device 704 might be implemented on one computer system, while the file system 706, the data deduplication device 708, and the data storage system 710 might be implemented on another computer system. Other combinations of component and computer systems are possible.

Figure 8:
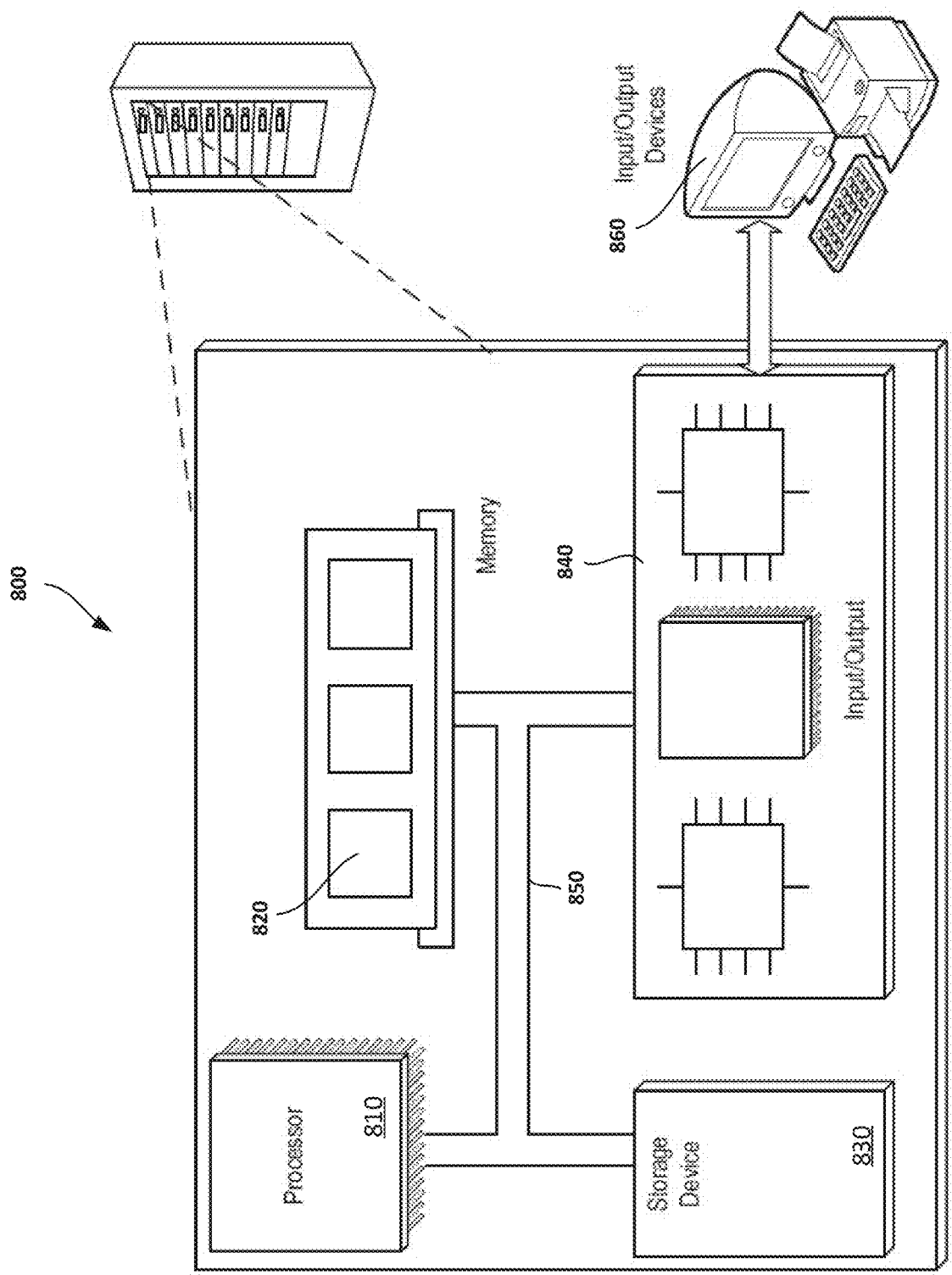
FIG. 8 is a block diagram of an example computer system.

FIG. 8 is a block diagram of an example computer system 800. For example, referring to FIGS. 1, 3, and 7, the systems 100, 300, and 700 could be an example of the one or more of the system 800 described here, as could a computer system used by any of the users who access resources of the systems 100, 300, and 700. As another example, referring to FIGS. 5-7, processes 500, 600, and 700 can be implemented by one or more of the system 800 described here. The system 800 includes a processor 810, a memory 820, a storage device 830, and an input/output device 40. Each of the components 810, 820, 830, and 840 can be interconnected, for example, using a system bus 850. The processor 810 is capable of processing instructions for execution within the system 800. In some implementations, the processor 810 is a single-threaded processor. In some implementations, the processor 810 is a multi-threaded processor. In some implementations, the processor 810 is a quantum computer. The processor 810 is capable of processing instructions stored in the memory 820 or on the storage device 830. The processor 810 may execute operations such as storing, maintaining, and displaying artifacts.

The memory 820 stores information within the system 800. In some implementations, the memory 820 is a computer-readable medium. In some implementations, the memory 820 is a volatile memory unit. In some implementations, the memory 820 is a non-volatile memory unit.

The storage device 830 is capable of providing mass storage for the system 800. In some implementations, the storage device 830 is a non-transitory computer-readable medium. In various different implementations, the storage device 830 can include, for example, a hard disk device, an optical disk device, a solid-state drive, a flash drive, magnetic tape, or some other large capacity storage device. In some implementations, the storage device 830 may be a cloud storage device, e.g., a logical storage device including multiple physical storage devices distributed on a network and accessed using a network. In some examples, the storage device may store long-term data. The input/output device 840 provides input/output operations for the system 800. In some implementations, the input/output device 840 can include one or more of a network interface devices, e.g., an Ethernet card, a serial communication device, e.g., an RS-232 port, and/or a wireless interface device, e.g., an 802.11 card, a 3G wireless modem, a 4G wireless modem, etc. A network interface device allows the system 800 to communicate, for example, transmit and receive data. In some implementations, the input/output device can include driver devices configured to receive input data and send output data to other input/output devices, e.g., a keyboard, a mouse, a printer, a sensor (e.g., a sensor that measures component or system-related properties, a sensor that measures environmental-related properties, or other types of sensors), and a display device 860. In some implementations, mobile computing devices, mobile communication devices, and other devices can be used.

A computing system can be realized by instructions that upon execution cause one or more processing devices to carry out the processes and functions described above, for example, storing, maintaining, and displaying artifacts. Such instructions can include, for example, interpreted instructions such as script instructions, or executable code, or other instructions stored in a computer readable medium. A computing system can be distributively implemented over a network, such as a server farm, or a set of widely distributed servers or can be implemented in a single virtual device that includes multiple distributed devices that operate in coordination with one another. For example, one of the devices can control the other devices, or the devices may operate under a set of coordinated rules or protocols, or the devices may be coordinated in another fashion. The coordinated operation of the multiple distributed devices presents the appearance of operating as a single device.

Although an example processing system has been described in FIG. 8, implementations of the subject matter and the functional operations described above can be implemented in other types of digital electronic circuitry, or in computer software, firmware, or hardware, including the structures disclosed in this specification and their structural equivalents, or in combinations of one or more of them. Implementations of the subject matter described in this specification, such as storing, maintaining, deduplicating, and revising data can be implemented as one or more computer program products, i.e., one or more modules of computer program instructions encoded on a tangible program carrier, for example a computer-readable medium, for execution by, or to control the operation of, a processing system. The computer readable medium can be a machine readable storage device, a machine readable storage substrate, a memory device, a composition of matter effecting a machine readable propagated signal, or a combination of one or more of them.

The term "system" may encompass all apparatus, devices, and machines for processing data, including by way of example a programmable processor, a computer, or multiple processors or computers. A processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, executable logic, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of non-volatile or volatile memory, media and memory devices, including by way of example semiconductor memory devices, e.g., EPROM, EEPROM, and flash memory devices; magnetic disks, e.g., internal hard disks or removable disks or magnetic tapes; magneto optical disks; and CD-ROM and DVD-ROM disks. The processor and the memory can be supplemented by, or incorporated in, special purpose logic circuitry. Sometimes a server is a general purpose computer, and sometimes it is a custom-tailored special purpose electronic device, and sometimes it is a combination of these things. Implementations can include a back end component, e.g., a data server, or a middleware component, e.g., an application server, or a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, a communication network. Examples of communication networks include a local area network ("LAN") and a wide area network ("WAN"), e.g., the Internet.

Certain features that are described above in the context of separate implementations can also be implemented in combination in a single implementation. Conversely, features that are described in the context of a single implementation can be implemented in multiple implementations separately or in any sub-combinations.

The order in which operations are performed as described above can be altered. In certain circumstances, multitasking and parallel processing may be advantageous. The separation of system components in the implementations described above should not be understood as requiring such separation.

Other implementations are possible. For example, although the description above described data storage in the context of a file system, other types of data storage can be used with the techniques described above. For example, the techniques described above could also be used with an object storage system. An object storage system is a storage system that stores data in data storage in the form of objects, for example, rather than as files. Unlike files, which are generally stored in a hierarchy in a file system, objects are generally stored absent a hierarchy. Instead, an object is associated with a unique identifier that enables an object storage system to identify and access the object in data storage.

Figure 9:
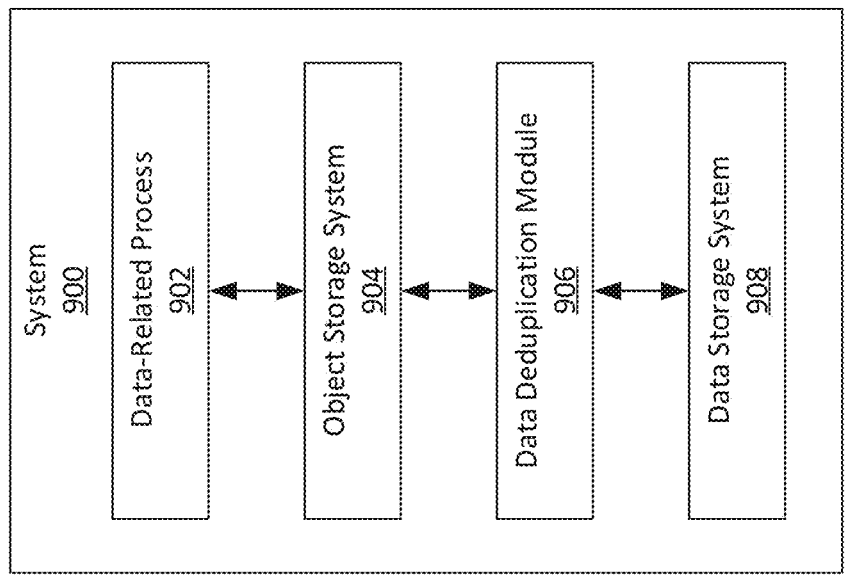
FIG. 9 is a block diagram of another example system that stores, retrieves, and modifies data.

FIG. 9 is a block diagram of a system 900 that stores, retrieves, and modifies data stored in the form of an object. The system 900 includes one or more data-related processes 902, one or more object storage systems 904, one or more data deduplication modules 906, and one or more data storage systems 908. In an example implementation, a user interacts with the system 900 (e.g., through an appropriate user interface) in order to create, delete, and modify data. When a user wishes to store particular data (e.g., to retain certain data for later retrieval), a data-related process 902 transmits that data to an object storage system 904. In turn, the object storage system transmits the data to the data deduplication module 906, which identifies data that can be deduplicated. The data deduplication module 906 then transmits the deduplicated data to the data storage system 908 for storage (e.g., within one or more physical storage devices or logical units). The data deduplication module 906 can act on the data received from the object storage system 904 in a manner similar described above, for example, partitioning the received data (e.g., data of objects) and applying deduplication techniques to the received data.

Figure 10:
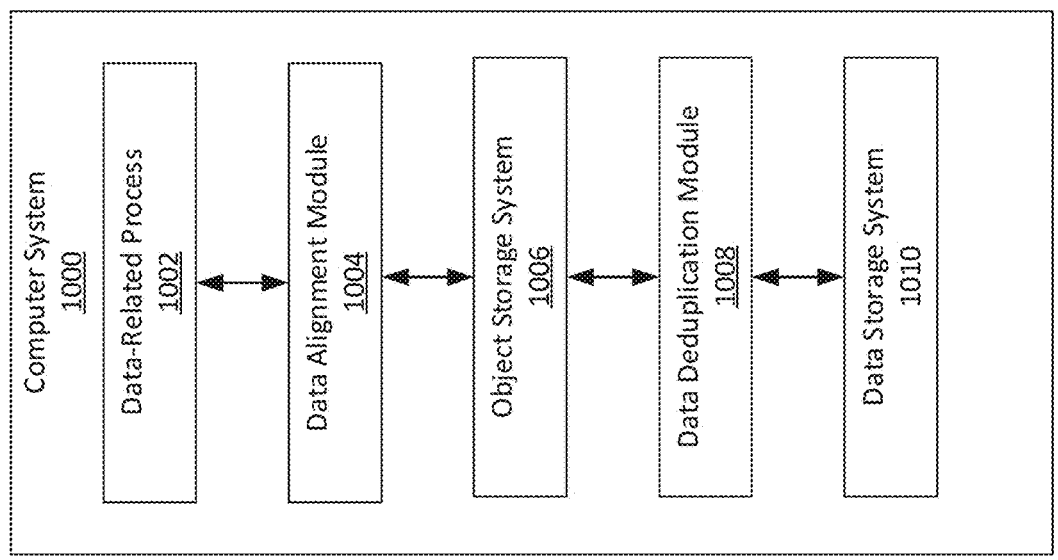
FIG. 10 is a block diagram of another system that stores, retrieves, and modifies data.

In a similar manner as described with respect to file-based systems (e.g., as shown and described with respect to FIG. 3), in some implementations, the performance of the system 900 can be improved by using a data alignment module. The data alignment module can, for example, manage the transfer of data between a data-related process and an object storage system, such that when data is written and subsequently revised by the system, the system potentially performs fewer data writing operations, and potentially exhibits less fluctuation in data deduplication efficiency. In some cases, the data alignment module can be implemented as an object storage system filter component (e.g., virtual object storage system, or filter driver) that is independent of the data storage system, such that the performance of the data storage system can be improved without modifying the data storage system itself. To illustrate, FIG. 10 is a block diagram of a system 1000 that includes a data alignment module 1004. Apart from the addition of the data alignment module 1004, the system 1000 can be similar to the system 900. For example, like the system 900, the system 1000 stores, retrieves, and modifies data. Further, the system 900 and the system 1000 can have similar components. For example, the system 1000 can have one or more data-related processes 1002 similar to the data-related processes 902, one or more object storage systems 1006 similar to the object storage system 904, and one or more data deduplication modules 1008 similar to the data deduplication module 906.

In an example implementation, a user interacts with the system 1000 (e.g., through an appropriate user interface) in order to create, delete, and modify data. When a user wishes to store particular data (e.g., to retain certain data for later retrieval), a data-related process 1002 transmits that data to the data alignment module 1004. The data alignment module 1004 modifies the data, creating intermediate data. The intermediate data is then transmitted to the object storage system 1006, which transmits the intermediate data to the data deduplication module 1008 for deduplication. The data deduplication module 1008 identifies data from the intermediate data that can be deduplicated. The data deduplication module 1008 then transmits the deduplicated data to the data storage system 1010 for storage (e.g., within one or more physical storage devices or logical units).

In another example, when a user wishes to retrieve particular data (e.g., previously stored data), a data-related process 1002 requests that data from the data alignment module 1004. In turn, the data alignment module 1004 requests intermediate data from the object system 1006. In turn, the object storage system 1006 transmits the request to the data deduplication module 1008, which retrieves deduplicated data from the data storage system 1010, and reconstructs the intermediate data. The intermediate data is then transferred to the object storage system 1006. In turn, the object storage system 1006 transmits the intermediate data to the data alignment module 1004, which reconstructs the requested data. The data alignment module 1004 then transmits the requested data to the data-related process 1002, which makes the data available to the user.

In another example, when a user wishes to modify particular data (e.g., previously stored data), a data-related process 1002 transmits the modified data to the data alignment module 1004. In turn, the data alignment module 1004 creates intermediate data, and transmits the intermediate data to the object storage system 1006. In turn, the object storage system 1006 transmits the intermediate data to the data deduplication module 1008 for deduplication. The data deduplication module 1008 then uses the data storage system 1010 to save deduplicated data for future retrieval.

In general, the above techniques can be performed with respect to objects in a similar manner as with respect to files (e.g., using one or more of the techniques described above with respect to FIGS. 4-9). Similarly, this can provide various benefits. For example, by first processing an object using the data alignment module 1004, when a data item is written and subsequently revised by the system, the system 1000 potentially performs fewer data writing operations, and potentially exhibits less fluctuation in data deduplication efficiency. Other implementations are within the scope of the following claims.

What is claimed is:

1. A system comprising:
a file storage system configured to store data in the form of storage system blocks on a non-volatile storage device, each storage system block being a same fixed size, wherein the file storage system is configured to store storage system blocks of only the fixed size;
a receiver module configured to receive write requests and read requests, wherein each write request comprises an indication to write a particular data item to the file storage system, and wherein each read request comprises an indication to read a particular data item from the file storage system; and
a data alignment module configured to:
identify, in response to the receiver module receiving a write request, a plurality of boundaries between portions of data within a data item of the write request, and provide to the file storage system an indication to allocate storage system blocks to the data item of the write request based on the plurality of boundaries, at least some of the portions of data being a different size than others of the portions of data, each storage system block being allocated to a single one of the portions of data; and
retrieve, in response to the receiver module receiving a read request, storage system blocks of the file storage system allocated to a data item of the read request.

2. The system of claim 1 wherein the file storage system comprises a cloud-based file storage system.

3. The system of claim 2 further comprising a cloud gateway device, the cloud gateway device configured to implement the receiver module and the data alignment module, and wherein the receiver module is to receive the write requests and the read requests from a file system, and wherein the data alignment module is to provide the indication to the cloud-based file storage system.

4. A method comprising:
receiving a single data file designated to be written to a file storage system, the file storage system configured to store data on a non-volatile storage device in the form of storage system blocks, each storage system block being a same fixed size, and wherein the file storage system is configured to store storage system blocks of only the fixed size;
identifying a plurality of boundaries between portions of data within the single data file, at least some of the portions of data being a different size than others of the portions of data; and
allocating storage system blocks to the single data file based on the plurality of boundaries, each storage system block being allocated to, at most, one of the portions of data.

5. The method of claim 4 in which the file storage system is associated with a deduplication engine capable of:
identifying that at least one of the storage system blocks allocated to the single data file based on the plurality of boundaries is a duplicate of another storage system block stored by the file storage system;
storing data indicating that the two storage system blocks are duplicates of each other; and
deleting or avoiding storage of one of the two storage system blocks in the file storage system.

6. The method of claim 4 wherein the single data file comprises an aggregation of a plurality of different files.

7. The method of claim 6 wherein the single data file is one of a zip file, a tar file, or an archive file.

8. The method of claim 4 wherein the plurality of boundaries is identified based on a rolling hash function.

9. The method of claim 4 wherein the plurality of boundaries is identified based on a Rabin fingerprinting function.

10. The method of claim 4 wherein identifying the plurality of boundaries between portions of data within the single data file comprises identifying boundaries between a plurality of different files aggregated in the single data file, and identifying a boundary within at least one of the plurality of different files.

11. A method comprising:
receiving an indication at a file storage system to allocate storage system blocks on a non-volatile storage device to a single data file based on a plurality of boundaries identified between portions of data within the single data file, each storage system block being allocated to only one of the portions of data, and each storage system block being a same fixed size, wherein the file storage system is configured to store storage system blocks of only the fixed size; and
while the single data file is being written to storage media associated with the file storage system, when a boundary identified between portions of data is reached, writing placeholder data to a remainder of a current storage system block.

12. The method of claim 11 wherein the indication is received from a file system filter component, the file system filter component being independent of the file storage system and being configured to pass through requests involving data storage or retrieval to the file storage system.

13. The method of claim 11 wherein the single data file comprises an aggregation of a plurality of different files.

14. The method of claim 11 wherein the file storage system is associated with a deduplication engine capable of:
identifying that at least one of the storage system blocks allocated to the single data file based on the plurality of boundaries is a duplicate of another storage system block stored by the file storage system;
storing data indicating that the two storage system blocks are duplicates of each other; and
deleting or avoiding storage of one of the two storage system blocks in the file storage system.

15. The method of claim 11 wherein the placeholder data comprises zeros.

16. The method of claim 11, further comprising indicating the location of the plurality of boundaries in a data structure maintained by the file storage system, the data structure representing the single data file.

17. The method of claim 16 wherein the data structure comprises an inode entry that indicates the length of data in a storage system block corresponding to the inode entry.

18. The method of claim 16 wherein the data structure comprises a metadata list of storage system block lengths generated by a file system filter component.

19. The method of claim 18 wherein the metadata list is stored in at least one of a separate data file, a database, or an extended attribute of the single data file.

20. A method comprising:
receiving an indication at a file storage system to allocate storage system blocks on a non-volatile storage device to a single data file based on a plurality of boundaries identified between portions of data within the single data file, each storage system block being allocated to only one of the portions of data, each storage system block being a same fixed size, and the file storage system being configured to store storage system blocks of only the fixed size; and while the single data file is being written to the file storage system, when a boundary identified between portions of data is reached, truncating a current storage system block.

* * * * *